(12) United States Patent
Masutani

(10) Patent No.: US 11,073,528 B2
(45) Date of Patent: Jul. 27, 2021

(54) PIPETTE TIP SUPPLY MECHANISM AND PIPETTE TIP SUPPLY METHOD

(71) Applicant: SYSMEX CORPORATION, Kobe (JP)

(72) Inventor: Kouichi Masutani, Kobe (JP)

(73) Assignee: Sysmex Corporation, Hyogo (JP)

( * ) Notice: Subject to any disclaimer, the term of this patent is extended or adjusted under 35 U.S.C. 154(b) by 339 days.

(21) Appl. No.: 16/286,973

(22) Filed: Feb. 27, 2019

(65) Prior Publication Data

US 2019/0265263 A1    Aug. 29, 2019

(30) Foreign Application Priority Data

Feb. 28, 2018    (JP) .............................. JP2018-034673

(51) Int. Cl.
| | |
|---|---|
| *G01N 35/10* | (2006.01) |
| *B01L 9/00* | (2006.01) |
| *G01N 35/04* | (2006.01) |
| *B65G 65/42* | (2006.01) |
| *B65G 47/14* | (2006.01) |
| *B65G 59/12* | (2006.01) |

(52) U.S. Cl.
CPC .............. *G01N 35/10* (2013.01); *B01L 9/543* (2013.01); *B65G 47/1407* (2013.01); *B65G 47/1492* (2013.01); *B65G 65/42* (2013.01); *G01N 35/04* (2013.01); *B65G 59/12* (2013.01); *G01N 2035/0434* (2013.01); *G01N 2035/0465* (2013.01); *G01N 2035/0475* (2013.01); *G01N 2035/0484* (2013.01); *G01N 2035/103* (2013.01); *G01N 2035/1051* (2013.01)

(58) Field of Classification Search
CPC combination set(s) only.
See application file for complete search history.

(56) References Cited

U.S. PATENT DOCUMENTS

| | | | |
|---|---|---|---|
| 2015/0101621 A1* | 4/2015 | Kramek ................. | B65G 37/00 131/281 |
| 2015/0225178 A1* | 8/2015 | Wargo ...................... | B07C 7/00 209/539 |
| 2019/0033121 A1* | 1/2019 | Alexander ............. | G01G 13/24 |

FOREIGN PATENT DOCUMENTS

| | | |
|---|---|---|
| JP | H11-287810 | 10/1999 |
| JP | 2004-184182 | 7/2004 |
| JP | 2012-154835 | 8/2012 |

* cited by examiner

*Primary Examiner* — Jill A Warden
*Assistant Examiner* — John McGuirk
(74) *Attorney, Agent, or Firm* — Brinks Gilson & Lione

(57) ABSTRACT

A pipette tip supply mechanism includes: a pipette tip storage unit for storing a plurality of tapered shaped pipette tips; a belt for transporting a pipette tip supplied from an opening of the pipette tip storage unit; and a belt drive unit that drives the belt in a transport direction. The belt is inclined upwards toward the transport direction so that the pipette tip is rotatable around a longitudinal axis of the pipette tip on a surface of the belt and the pipette tip is rolled to orient the longitudinal axis of the pipette tip along the transport direction in conjunction with the drive of the belt in the transport direction.

18 Claims, 15 Drawing Sheets

Arrow 950 view

Arrow 951 view

PIPETTE TIP SUPPLY MECHANISM AND PIPETTE TIP SUPPLY METHOD

RELATED APPLICATIONS

This application claims priority from prior Japanese Patent Application No. 2018-034673, filed on Feb. 28, 2018, entitled "Pipette Supply Mechanism and Pipette Supply Method", the entire contents of which are incorporated herein by reference.

BACKGROUND OF THE INVENTION

1. Field of the Invention

The present invention relates to a pipette tip supply mechanism and a pipette tip supply method.

2. Description of the Related Art

Pipette tip supply mechanisms used for clinical examinations and the like are known (for example, see Japanese Patent Application Publication No. H11-287810).

As shown in FIG. 24, Japanese Patent Application Publication No. H11-287810 discloses an automatic supply apparatus provided with transport means which includes a hopper 902 for accommodating nozzle tips 901 which are pipette tips, and a blade-equipped belt 903 for transporting the nozzle tips 901 that drop from a bottom opening of the hopper 902. About 500 nozzle tips 901 are accommodated in the hopper 902 in a bulk state. The bladed belt 903 is provided with blades 904 rising from the surface of the belt at regular intervals in the transport direction. The blades 904 are linearly provided in the width direction orthogonal to the conveyance direction of the belt. The fixed interval between the blades 904 is set to be a distance having a slight clearance in the maximum outer diameter of the nozzle tip 901. In this way the nozzle tip 901 dropped onto the blade-equipped belt 903 is fitted between the blades 904 one by one with the longitudinal axis oriented in the width direction of the belt. Since the nozzle tip 901 is held between the blades 904, the nozzle tip 901 is unable to rotate on the blade-equipped belt 903 and is in a state where it cannot move relative to the belt.

SUMMARY OF THE INVENTION

Here, the pipette tip supply mechanism is required to have a function of separating aggregates of many pipette tips separately and sending them one by one to the supply position without causing jamming. However, the pipette tip has the following features which makes automatic supply difficult. First, the pipette tip has a tapered shape toward the distal end where suction and discharge are performed, and it can be caught in a slight gap. Second, since the pipette tip is formed of a flexible material, it is easily deformed by external force. Third, in a state in which many pipette tips are stored in a bulk state, a cluster of overlapping pipette tips in which, for example, the tip of one of two pipette tips is inserted inside another pipette tip may be formed. Pipette tip clusters cannot be used without separation.

In the above Japanese Patent Application Publication No. H11-287810, although one pipette tip is intended to be contained between the blades of the blade-equipped belt, since a pipette tip cluster in which one pipette tip is inserted into another pipette tip does not have a larger outer diameter than a single pipette tip, it is thought that a pipette tip cluster will fit in between the blades as it is. In that case, the pipette tip cluster is sent out without being separated, which causes a poor supply of the pipette tips. It is therefore desirable to be able to eliminate overlapping of pipette tips even when overlapping pipette tip clusters are formed with the tip of one of two pipette tips being inserted inside the other.

The present invention is intended to solve the problem of overlapping pipette tip clusters in a state in which the tip of one of two pipette tips is inserted into another pipette tip.

A pipette tip supply mechanism according to a first aspect of the present invention includes a pipette tip storage unit (20) for storing a plurality of tapered pipette tips (10), a belt (30) for transporting the pipette tip (10) supplied from an opening (23) of the pipette tip storage unit (20), and a belt drive unit (40) for driving the belt (30) in the transport direction, wherein the belt (30) is inclined upwards toward the transport direction so that the pipette tip (10) is rotatable around a longitudinal axis of the pipette tip on a surface of the belt and the pipette tip is rolled to orient the longitudinal axis of the pipette tip along the transport direction in conjunction with the drive of the belt in the transport direction. Note that the longitudinal axis of the pipette tip is the central axis of the pipette tip extending in the longitudinal direction connecting the front end and the rear end of the pipette tip.

In the pipette tip supply mechanism according to the first aspect described above, the belt (30) is inclined upwards toward the transport direction so that the pipette tip (10) is rotatable around a longitudinal axis of the pipette tip (10) on a surface of the belt (30) and the pipette tip (10) is rolled to orient the longitudinal axis of the pipette tip (10) along the transport direction in conjunction with the drive of the belt (30) in the transport direction. In this way, even when an overlapped pipette tip cluster (15) is supplied onto the belt (30), in a state in which the tip of one of the two pipette tips (10) is inserted inside the other pipette tip, the pipette tip cluster (15) rotates on the belt (30). Since the distal end side is relatively light and the rear end side becomes heavy at this time in the tapered pipette tip (10), the pipette tip cluster (15) can be rotated until the pipette tip cluster (15) becomes oriented along the transport direction with the distal end on the upper side and the rear end on the lower side on the upwardly inclined belt (30). When the pipette chip cluster (15) is oriented along the transport direction, the pipette tip cluster (15) is transported so as to be pulled up on the inclined belt (30) by the frictional force with the surface of the belt (30). At this time, although the front pipette tip (10) of the pipette tip cluster (15) is brought into contact with the belt (30) from the front end to the rear end to receive a frictional force, only the rear end side of the rear pipette tip (10) of the pipette tip cluster (15) contacts the belt (30) and receives a frictional force since the tip of the rear pipette tip (10) is inserted into the front pipette tip (10). That is, since the front pipette tip (10) is transported with a greater frictional force than the rear pipette tip (10), the front pipette tip (10) moves forward from the rear side pipette tip (10) so that the overlapping of the pipette tip cluster (15) can be eliminated during transport. When the pipette tip cluster (15) drops from the transport end point of the belt (30), the front side pipette tip (10) drops first since the pipette tip cluster (15) is oriented along the transport direction, whereby the overlap of the pipette chip cluster (15) can be eliminated. As a result, it is possible to eliminate the overlap of the overlapped pipette tip cluster (15) in which the tip of one of the two pipette tips (10) is inserted in another pipette tip (10).

The pipette tip supply mechanism according to the first aspect preferably also includes a pipette tip contact unit (50) at the transport end point (ED) of the belt (30), to contact the pipette tip cluster (15), in which the tip of one of two pipette tips (10) overlaps the other and is inserted in the other pipette tip (10), to eliminate the overlap of the pipette tip cluster (15). According to this configuration, the overlap of the pipette tip cluster (15) can be eliminated more reliably by the contact between the pipette tip contact unit (50) and the transported pipette tip cluster (15). In particular, since the orientation of the pipette tip cluster (15) can be controlled on the belt (30) so as to follow along the transport direction, it is possible to equalize the orientation of the pipette tip cluster (15) when making contact with the pipette tip contact unit (50). As a result, an external force for separating the two pipette tips (10) can be more reliably applied to the pipette tip cluster (15) since it is possible to prevent the pipette chip cluster (15) from passing without contacting the pipette tip contact unit (50).

In the configuration in which the belt (30) is inclined upward in the transport direction and includes the pipette tip contact unit (50), it is preferable that when the longitudinal length of the pipette tip cluster (15) is a first distance (L1) and the length from the rear end opposite to the tip end of one pipette tip (10) to the center of gravity is a second distance (L2), the pipette tip contact unit (50) is disposed at a position separated from the transport endpoint (ED) by a distance that is less than the first distance (L1) and greater than the second distance (L2). Here, when the pipette tip contact unit (50) is provided at a position at a distance equal to or greater than the first distance (L1) from the belt (30), there is a possibility that the pipette tip cluster (15) will not contact the pipette tip contact unit (50). When the pipette tip contact unit (50) is provided at a position at a distance equal to or less than the second distance (L2) from the belt (30), there is a possibility that no external force to separate the pipette tip cluster (15) will act thereon and the pipette tip cluster (15) will drop intact. Therefore, by disposing the pipette tip contact unit (50) at the above-described position, the pipette tip contact unit (50) and the pipette tip cluster (15) can be brought into contact with each other and an external force for separating the two pipette tips (10) can be applied to the pipette tip cluster (15).

In this case, it is preferable that when the longitudinal length of one pipette tip (10) is a third distance (L3), the pipette tip contact unit (50) is disposed at a position separated from the transport end point (ED) of the belt (30) by a distance that is less than the third distance (L3). According to this configuration, at least the front pipette tip (10) of the pipette tip cluster (15) and the pipette tip contact unit (50) can be brought into contact. Therefore, it is possible to apply an external force for separating the two pipette tips (10) by bending the pipette tip cluster (15) between the front and rear pipette tips (10).

In the configuration including the pipette tip contact unit (50), it is preferable that the pipette tip contact unit (50) is disposed at a position lower than the belt upper surface at the transport end point (ED) of the belt (30). According to this configuration, it is possible to effectively apply an external force for separating the two pipette tips (10) by utilizing the movement of the pipette tip cluster (15) dropping from the belt (30). For example, although there is a possibility that the pipette tip cluster (15) directly rides on the pipette tip contact unit (50) and stabilizes when the pipette tip contact unit (50) is on the extension line of the upper surface of the belt, it is possible to more surely eliminate the overlapping of the pipette tip cluster (15) by using the configuration utilizing the momentum of the drop.

In the pipette tip supply mechanism according to the first aspect, it is preferable that the belt (30) is inclined so as to be higher from the transport start point (ST) where the pipette tip (10) is supplied from the opening (23) of the pipette tip storage unit to the transport end point (ED). Here, for example, there is a possibility that the direction of the pipette tip cluster (15) changes in the opposite direction if there is a low place during transport, whereas according to the above configuration, the orientation of the pipette tip cluster (15) can be controlled more easily and reliably so that the tip of the pipette tip cluster (15) faces the transport end point (ED) since the height monotonically increases toward the transport end point (ED).

In the pipette tip supply mechanism according to the first aspect, it is preferable that the inclination angle (θ) of the belt (30) is 20 degrees or more and 35 degrees or less relative to the horizontal plane. Here, the pipette tip (10) does not slide and the transport force can be applied to the pipette tip (10) as the belt (30) is approaches horizontal, whereas the pipette tip (10) easily slides so as to make it difficult for the transport force to act on the pipette tip (10) as the inclination angle (θ) approaches 90 degrees. As a result of intensive study by the inventors of the present invention, when the inclination angle (θ) of the belt (30) is less than 20 degrees, the pipette tips (10) are easily transported collectively and the aggregation of pipette tips (10) became difficult to separate. On the other hand, when the inclination angle (θ) of the belt (30) is greater than 35 degrees, the pipette tip (10) slips excessively and the transportability of the pipette tip (10) declined. Therefore, in a pipette tip supply mechanism (100) which is required to have a function of separating an aggregate of a plurality of pipette tips into individual pieces and sending them one by one without causing jamming, it is preferable that the inclination angle (θ) of the belt (30) is 20 degrees or more and 35 degrees or less relative to the horizontal plane.

In the pipette tip supply mechanism according to the first aspect, the surface of the belt (30) on which the pipette tip (10) is disposed is a flat surface without substantial unevenness. Note that a flat surface without substantial unevenness means that the belt itself is not a deformed belt such as a bladed belt or a belt with a crosspiece but a flattened belt; for example, it is a concept that allows unevenness of the material itself configuring the belt, such as unevenness due to fiber mesh and the like. According to this configuration, unlike a blade-equipped belt, a belt with a crosspiece or the like that transports the uneven portion by engaging with the transported object, the pipette tip cluster (15) and the belt (30) do not engage with each other, and the direction of the pipette tip cluster (15) is easily controlled by rotating the pipette tip cluster (15) on the belt (30). Since the pipette tip cluster (15) and the belt (30) do not engage, it is possible to suppress the pipette tip (10) from being deformed by an excessive external force acting on the pipette tip (10) during transport.

In the pipette tip supply mechanism according to the first aspect, it is preferable that the belt (30) has a width in the width direction orthogonal to the transport direction that is equal to or greater than the longitudinal length of the pipette tip cluster (15) overlapped in a state in which the tip of one pipette tip (101) is inserted into another pipette tip (10). According to this configuration, even when the pipette tip cluster (15) is supplied from the pipette tip storage unit (20) in the width direction, there is ensured space for aligning the directions by rotating the pipette tip cluster (15). In addition, it is possible to prevent the pipette tip cluster (15) from protruding to the outside of the belt (30) or getting caught in a gap of the belt (30).

In the pipette tip supply mechanism according to the first aspect, the pipette tip storage unit (20) preferably has an opening (23) on the bottom surface arranged above the belt (30), and the belt (30) is arranged at a position where the pipette tip (10) drops from the opening (23) of the pipette tip storage unit (20). According to this configuration, since the pipette tip (10) can be supplied to the belt (30) by dropping the pipette tip (10) from the pipette tip storage unit (20), the occurrence of jamming of the pipette tips (10) between the pipette tip storage unit (20) and the belt (30) can be prevented. Since the pipette tip storage unit (20) and the belt (30) also are in a vertically aligned positional relationship, the installation area of the pipette tip supply mechanism (100) can be reduced.

In the pipette tip supply mechanism according to the first aspect, a side wall (160) preferably is provided on both sides of the belt (30) for preventing the pipette tip (10) from falling from the belt (30). According to this configuration, even when the pipette tip (10) rolls on the belt (30), it is possible to prevent the pipette tip (10) from dropping from the belt (30) by the side walls (160) on both sides.

In this case, a cover member (155) covering a gap between the side wall (160) and the belt (30) preferably is provided at a supply position where the pipette tip (10) is supplied onto the belt (30). As described above, it is difficult to control the attitude of the pipette tip (10), and the tip of the pipette tip (10) tends to get caught in the gap since the pipette tip (10) has a tapered shape and its tip is liable to be caught in a gap, especially at the supply position from the pipette tip storage unit (20) onto the belt (30). Therefore, by providing the cover member (155), it is possible to more reliably prevent the pipette tip (10) from being caught in the gap between the side wall (160) and the belt (30) at the supply position.

In the pipette tip supply mechanism according to the first aspect, it is preferable that a rotary roller (140) and a roller drive unit (145) are also provided in the opening (23) of the pipette tip storage unit (20). According to this configuration, it is possible to control the quantity of the pipette tips (10) supplied from the opening (23) by controlling the drive amount of the rotating roller (140). As a result, it is possible to prevent overlapping of a pipette tip cluster (15) and jamming due to excessive supply of the pipette tips (10) onto the belt (30).

In this case, preferably, the rotating roller (140) has projections (141) on its surface. According to this configuration, the pipette tips (10) gathered in the vicinity of the opening (23) in the pipette tip storage unit (20) are agitated and a state of engagement between pipette tips (10) can be easily eliminated by rotationally driving the rotating roller (140).

In the configuration that also includes the rotating roller (140) and the roller drive unit (145), the rotating roller (140) is provided so as to span over both ends of the opening (23), and the rotating roller (140) has a smaller outer diameter at the bilateral ends than the outer diameter of the central portion. According to this configuration, the outer diameter of both end portions of the rotating roller (140) is reduced, so that the space between the end portion of the rotating roller (140) and the edge portion of the opening (23) can be increased. As a result, it is possible to prevent the pipette tip (10) from being caught and bent in the vicinity of the edge of the opening (23).

In the configuration including the pipette tip contact unit (50), a receiving unit (110) for receiving the pipette tip (10) dropped from the transport end point of the belt (30) preferably is also provided below the pipette tip contact unit (50). According to this configuration, it is possible to reliably receive the respective pipette tips by the receiving unit (110) after contact with the pipette tip contact unit (50) to eliminate overlapping of the pipette tip cluster (15).

The pipette tip supply mechanism according to the first aspect preferably also includes a cutout part (120) for separately feeding the pipette tips (10) transported by the belt (30). According to this configuration, individual pipette tips (10) separated from each other can be delivered one by one by the cutout part (120).

A pipette tip supply method according to a second aspect of the present invention is a method for supplying a plurality of stored pipette tips (10) onto a belt (30), and the pipette tip (10) is transported on the belt (30) that is inclined upwards toward the transport direction so that the pipette tip (10) is rotatable around a longitudinal axis of the pipette tip on a surface of the belt (30) and the tapered pipette tip (10) is rolled to orient the longitudinal axis of the pipette tip along the transport direction in conjunction with the drive of the belt in the transport direction.

In the pipette tip supply method according to a second aspect of the present invention as stated above, the pipette tip (10) is transported on the belt (30) that is inclined upwards toward the transport direction so that the pipette tip (10) is rotatable around a longitudinal axis of the pipette tip (10) on a surface of the belt (30) and the pipette tip (10) is rolled to orient the longitudinal axis of the pipette tip along the transport direction in conjunction with the drive of the belt (30) in the transport direction. In this way even when a pipette tip cluster (15) overlapped with the tip of one of two pipette tips (10) inserted in the other pipette tip (10) is supplied onto the belt (30), the pipette tip cluster (15) can be rotated until the orientation of the pipette tip cluster (15) has the leading end upstream and the rear end downstream along the transport direction. Since the front side pipette tip (10) of the pipette tip cluster (15) is transported with greater frictional force than the rear side pipette tip (10), the front side pipette tip (10) moves forward from the rear side pipette tip (10) so that the overlapping of the pipette tip cluster (15) can be eliminated during transport. When the pipette tip cluster (15) drops from the transport end point of the belt (30), the front side pipette tip (10) drops first since the pipette tip cluster (15) is oriented along the transport direction, whereby the overlap of the pipette chip cluster (15) can be eliminated. As a result, it is possible to eliminate the overlap of the overlapped pipette tip cluster (15) in which the tip of one of the two pipette tips (10) is inserted in another pipette tip (10).

In the pipette tip supply method according to the second aspect, a pipette tip cluster (15), in which the tip of one of the two pipette tips (10) overlaps in a state of being inserted inside the other pipette tip (10), is brought into contact with the pipette tip contact unit (50) at the transport end point (ED) of the belt (30) to eliminate the overlap of the pipette tip cluster (15). According to this configuration, the overlap of the pipette tip cluster (15) can be eliminated more reliably by the contact between the pipette tip contact unit (50) and the transported pipette tip cluster (15). In particular, since the orientation of the pipette tip cluster (15) can be controlled on the belt (30) so as to follow along the transport direction, it is possible to equalize the orientation of the pipette tip cluster (15) when making contact with the pipette tip contact unit (50). As a result, an external force for separating the two pipette tips (10) can be more reliably applied to the pipette tip cluster (15) since it is possible to prevent the pipette chip cluster (15) from passing without contacting the pipette tip contact unit (50).

In the pipette tip supply method according to the second aspect, it is preferable that the pipette tip (10) is transported on the belt (30) that is inclined upwards toward the transport direction so that the tapered pipette tip (10) is rotatable around a longitudinal axis of the pipette tip (10) on a surface of the belt (30) and the pipette tip (10) is rolled to orient the longitudinal axis of the pipette tip along the transport direction in conjunction with the drive of the belt (30) in the transport direction. According to this configuration, it is possible to control the orientation of the pipette tip cluster (15) on the belt (30) along the transport direction. Since the front pipette tip (10) is transported with greater frictional force than the rear pipette tip (10), the front pipette tip (10) is transported in forward from the rear pipette tip (10) so that the overlapping of the pipette tip cluster (15) can be eliminated during transport by appropriately setting the frictional force with the belt (30). When the pipette tip cluster (15) drops from the transport end point of the belt (30), the front side pipette tip (10) drops first since the pipette tip cluster (15) is oriented along the transport direction, whereby the overlap of the pipette chip cluster (15) can be eliminated. Since the orientation of the pipette tip cluster (15) can be made uniform when making contact with the pipette tip contact unit (50), it also is possible to more surely apply an external force on the pipette tip cluster (15) for separating the two pipette tips (10). As a result, it is possible to eliminate the overlapping of the pipette tip cluster (15) more reliably.

A pipette tip supply mechanism according to a third aspect of the present invention includes a pipette tip storage unit (20) for storing a plurality of pipette tips (10), a belt (30) for transporting the pipette tip (10) supplied from an opening (23) of the pipette tip storage unit (20), a belt drive unit (40) for driving the belt (30) in the transport direction, and a pipette tip contact unit (50) for eliminating the overlap of the pipette tip cluster (15) by contacting the overlapped pipette tip cluster (15) in a state where one end of one pipette tip (10) is inserted into the other end of another pipette tip (10) at a transport end point (ED) of the belt (30).

In the pipette tip supply mechanism according to the third aspect described above, a pipette tip contact unit (50) is provided at the transport end point (ED) of the belt (30) for contacting the pipette tip cluster (15) to eliminate the overlap of the pipette tip cluster (15) in which one end one of the two pipette tips (10) overlaps in a state of being inserted in the other pipette tip (10). Note that since the pipette tip cluster (15) is naturally formed in the storage state or in the transportation process and is not in a strong fitting state like press-fitting, the pipette tip cluster (15) can easily be eliminated if it is possible to apply a force to mutually separate the two pipette tips (10). Therefore, an external force for separating the two pipette tips (10) is caused to act on the pipette tip cluster (15) by bringing the transported pipette tip cluster (15) into contact with the pipette tip contact unit (50) to eliminate the overlap of the tip cluster (15).

Effects of the Invention

According to the present invention, it is possible to eliminate the overlap of a pipette tip cluster in a state in which the tip of one end of one of the two pipette tips are inserted into the other end of another pipette tip (10).

DETAILED DESCRIPTION OF THE PREFERRED EMBODIMENTS

Figure 1A:
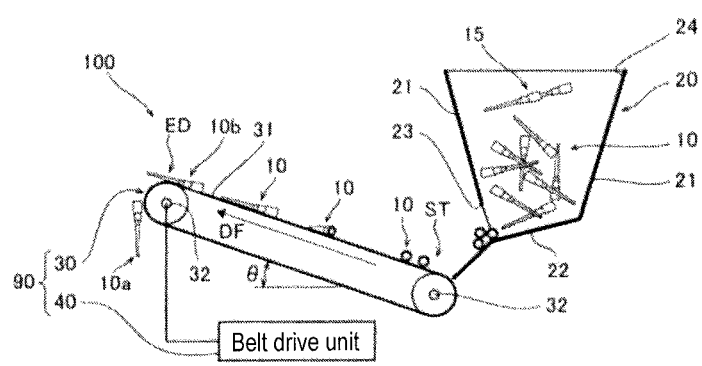
FIG. 1A is a schematic view of a pipette tip supply mechanism according to a first embodiment.

Hereinafter, embodiments will be described with reference to the drawings.

First Embodiment

Summary of Pipette Tip Supply Mechanism

First, a summary of the pipette tip supply mechanism 100 according to the first embodiment will be described referring to FIG. 1.

The pipette tip supply mechanism 100 is a device that stores a large number of pipette tips 10 used for sample analysis, and supplies the stored pipette tips 10 one by one. The pipette tip supply mechanism 100 also may be configured as a single device or may be configured as a unit that is incorporated in the sample analysis apparatus and that supplies the pipette tip 10 to a unit that suctions and discharges the sample.

The pipette tip supply mechanism 100 includes a pipette tip storage unit 20, a belt 30, and a belt drive unit 40.

Figure 1B:
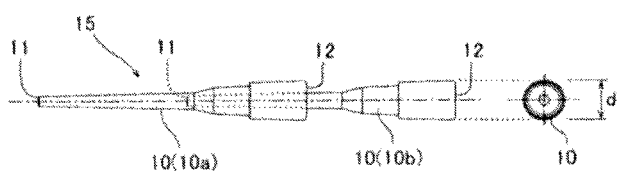
FIG. 1B is a schematic view of a pipette tip.

As shown in FIG. 1B, the pipette tip 10 is a tubular member attached to the distal end of a dispensing nozzle. The pipette tip 10 has an approximately conical tapered shape, and an opening for suctioning or discharging a liquid is formed at the tip 11. An opening for mounting on the dispensing nozzle is formed at the rear end 12 opposite to the tip 11. The pipette tip 10 has a predetermined capacity corresponding to the external size, and can internally hold a predetermined volume of liquid suctioned from the tip 11. The liquid is suctioned and discharged by pressure supplied from the dispensing nozzle attached to the rear end 12. The pipette tip 10 allows the dispensing nozzle to suction and discharge while staying out of contact with the liquid. The pipette tip 10 is made of a flexible resin material or the like and is easily deformed. The pipette tip 10 is a consumable item exchanged every time a sample is suctioned and discharged, and it is a disposable item to be discarded after use.

As shown in FIG. 1A, the pipette tip storage unit 20 can store a plurality of tapered pipette tips 10. That is, the pipette tip storage unit 20 is configured as a container capable of storing a plurality of pipette tips 10. The pipette tip storage unit 20 has a side surface 21 and a bottom surface 22 for defining an internal space for accommodating the pipette tips 10. In FIG. 1, the pipette tip storage unit 20 is provided with an upper opening 24 as an input port. In the upper opening 24, for example, an openable/closable lid (not shown) is provided. The pipette tip 10 is put into the pipette tip storage unit 20 by the user. The pipette tip storage unit 20 is configured to be able to receive a plurality of pipette tips 10 in a bulk state. That is, the pipette tip storage unit 20 receives the pipette tips 10 that is put in an arbitrary orientation, and does not receive the pipette tips 10 in a state in which the pipette tips 10 are aligned one by one in a fixed orientation. Therefore, the pipette tip 10 is stored in an unspecified posture in the pipette tip storage unit 20.

The pipette tip storage unit 20 can store, for example, more than 100 pipette tips 10. The pipette tip storage unit 20 also may be capable of storing, for example, 500, 1000, or 1500 pipette tips 10. The pipette tip storage unit 20 also may be capable of storing more than 1,500 pipette tips 10.

The pipette tip storage unit 20 supplies the pipette tip 10 to the belt 30. The pipette tip storage unit 20 is provided with an opening 23 for supplying the pipette tip 10 onto the belt 30. The opening 23 is formed in the side surface 21 or the bottom surface 22 of the pipette tip storage unit 20. FIG. 1 shows an example in which the opening 23 is formed in the side surface 21. The opening 23 is formed to have such a size that the pipette tip 10 can pass through. The pipette tip 10 stored in the pipette tip storage unit 20 can be supplied onto the belt 30 through the opening 23 in an arbitrary orientation. The pipette tip storage unit 20 may be provided with means for controlling the orientation of the pipette tip 10 supplied from the opening 23. For example, one to several pipette tips 10 can be supplied collectively to the belt 30.

The belt 30 transports the pipette tip 10 supplied from the opening 23 of the pipette tip storage unit 20. The belt 30 is formed in a loop shape and is looped around a pair of pulleys 32. The pulley 32 on the downstream side in the transport direction DF is rotationally driven by the belt drive unit 40, whereby the belt 30 is driven in the transport direction DF. Although the transport path of the belt 30 is not necessarily limited, for example, it is configured as a linear path.

In the first embodiment, the belt 30 is rotatable and the pipette tip (10) is rotatable around a longitudinal axis of the pipette tip on a surface 31 of the belt 30. Note that the longitudinal axis of the pipette tip 10 is the central axis of the pipette tip 10 extending in the longitudinal direction connecting the front end 11 and the rear end 12. The rotation of the pipette tip 10 around the longitudinal axis means that the belt 30 does not have a structure on the belt surface 31 that prevents rotational movement of the pipette tip 10, such as a wall rising from the surface 31 or a channel recessed from the surface 31. Unevenness or the like which does not hinder rotational movement of the pipette tip 10 may be formed on the surface of the belt 30. Since the pipette tip 10 has a tapered shape, as the pipette tip 10 rolls on the surface 31 of the belt 30, the orientation of the pipette tip 10 on the surface 31 of the belt 30 changes.

The belt 30 is inclined upward in the transport direction DF so that the longitudinal axis of the pipette tip 10 that rolls with the drive in the transport direction DF is oriented in the transport direction DF. That is, the height position of the upper surface of the belt 30 on which the pipette tip 10 is disposed is higher toward the transport direction DF. The upper surface of the belt 30 is an inclined surface, and by the action of gravity, the pipette tip 10 can roll on the incination. The inclination angle θ of the belt 30 relative to the horizontal plane is, for example, 5 degrees or more and 45 degrees or less. Although the inclination angle θ is constant in FIG. 1A, the inclination angle θ of the belt 30 also may change in the middle of the conveyance path.

The belt 30 is configured to individually disperse the supplied pipette tips 10 in the course of transport. Specifically, the belt 30 is formed of a material having a coefficient of friction capable of transporting the pipette tip 10 with sliding in a state of being inclined at an inclination angle θ. Therefore, for example, when five pipette tips 10 are densely supplied at the supply position which is the transport start point ST, the pipette tips 10 move with sliding on the inclined surface of the belt 30, whereby the pipette tips 10 are dispersed and separated. In this way the belt 30 is configured to disperse pipette tips (10) into one or two by the transport end point ED.

The belt drive unit 40 drives the belt 30 in the transport direction DF. The belt drive unit 40 is, for example, an electric motor directly or indirectly connected to the pulley 32. In FIG. 1A, the belt drive unit 40 indirectly drives the belt 30 by rotationally driving the pulley 32. By rotationally driving the belt 30, the pipette tip 10 supplied to the upper surface of the belt 30 is moved in the transport direction DF.

The pipette tip supply mechanism 100 drops the pipette tip 10 from the transport end point ED of the belt 30, and sends the pipette tip 10 to the receiving point of the transport end point ED.

As shown in FIG. 1B, the pipette tip 10 supplied from the pipette tip storage unit 20 may be a pipette tip cluster 15 in which the tip 11 of one of the two pipette tips 10 is inserted in the other pipette tip 10 in some cases. However, since the pipette tip cluster 15 is not artificially inserted and fitted with the other pipette tip 10, it can be said that the pipette tip cluster is simply in an overlapping state, and it is easy to separate it if conditions are fulfilled.

In the pipette tip supply mechanism 100 of the first embodiment, it is possible to eliminate the overlapping of the pipette tip cluster 15 during the process of transporting the pipette tip 10 on the inclined belt 30. In the pipette tip supply mechanism 100, it also is possible to eliminate the overlap of the pipette tip cluster 15 when dropping the pipette tip cluster 15 from the transport end point ED of the belt 30. That is, in the pipette tip supply mechanism 100, the conditions for separating the pipette tips 10 of the pipette tip cluster 15 can be adjusted in the process of transporting the pipette tip 10 on the inclined belt 30. Hereinafter, a pipette tip supply method by the pipette tip supply mechanism 100 will be described.

The pipette tip supply method of the first embodiment includes at least the following (1) to (3). (1) Multiple stored pipette tips 10 are supplied onto the belt 30. (2) The tapered pipette tip 10 rolls around the longitudinal axis on the rotatable belt 30, and the belt 30 is inclined upward in the transport direction DF and driven in the transport direction DF. (3) The pipette tip 10 on the belt 30 is transported in the transport direction DF while the longitudinal axis of the pipette tip 10 that rolls in conjunction with the drive in the transport direction DF is directed in the transport direction DF.

Figure 1C:
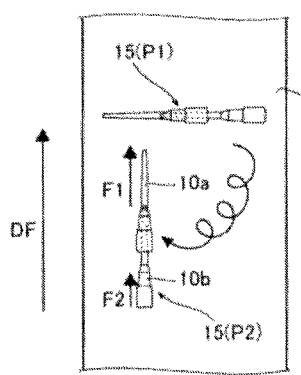
FIGS. 1C and 1D show a state before and after separation of a pipette tip cluster.

Specifically, as shown in FIG. 1C, it is assumed that, for example, the pipette tip cluster 15 is supplied onto the belt 30 in the orientation P1 oriented in the width direction of the belt 30. When the belt 30 is driven in the transport direction DF, the pipette tip cluster 15 is raised in the transport direction DF, but since the substantially conical pipette tip cluster 15 is transverse to the slope, the pipette tip mass 15 rolls and rotates around the longitudinal axis in the downward direction of the inclined surface of the belt 30. Since the tip 11 side is relatively light and the rear end 12 side is heavy in the tapered pipette tip 10, The pipette tip cluster 15 rotates until and becomes the orientation P2 along the transport direction DF where the front end 11 is the upper side and the rear end 12 is the lower side even in the pipette tip cluster 15. In a state substantially in the vicinity of the orientation P2 along the transport direction DF, the pipette tip cluster 15 does not receive the moment about the longitudinal axis and stops rotating.

When the pipette tip cluster 15 reaches the orientation P2 along the transport direction DF, the pipette tip cluster 15 is transported so as to be raised in the transport direction on the moving belt 30 by the frictional force with the surface of the belt 30.

Figure 1D:
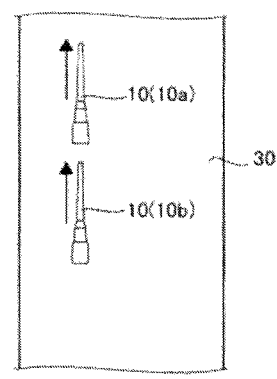

At this time, the pipette tip 10a on the front side of the pipette tip cluster 15 comes into contact with the belt 30 and receives a frictional force from the front end 11 to the rear end 12, whereas the front end 11 of the pipette tip 10b on the rear side only comes into contact with the belt 30 and receives a frictional force since it is inserted into the front pipette tip 10a. That is, since the frictional force F1 acting on the front-side pipette tip 10a is greater than the frictional force F2 acting on the rear-side pipette tip 10b, the front-side pipette tip 10a is fed in forward from the rear-side pipette tip 10b to separate the two pipette tips 10. The rear pipette tip 10b is transported with sliding relative to the belt 30. As a result, the overlapping of the pipette tips 15 is eliminated during transport, as shown in FIG. 1D. After the overlap is eliminated, the frictional forces acting on the front and the rear pipette tips 10a and 10b are substantially equal to each other, and are transported in the same manner.

Since the pipette tip cluster 15 is in the orientation P2 along the transport direction DF, it is possible to eliminate the pipette tip cluster 15 by the front pipette tip 10 dropping first when the pipette tip cluster 15 drops from the transport end point of the belt 30 in FIG. 1A. That is, by establishing the orientation P2, it is possible to make the drop timing of the front pipette tip 10a and the drop timing of the rear pipette tip 10b different from each other among the two pipette tips 10 of the pipette tip cluster 15. As a result, the overlap of the pipette tip cluster 15 is eliminated.

As described above, in the pipette tip supply mechanism 100 and the pipette tip supply method according to the first embodiment, the belt 30, on which the pipette tip 10 can roll and rotate around the longitudinal axis, is moved along the transport direction DF by tilting the rolling pipette tip 10 upward in the transport direction DF so that the longitudinal axis of the rolling pipette tip 10 is aligned in the transport direction DF, such that it is possible to eliminate the overlap of the overlapping pipette tip cluster 15 that exists in a state in which the tip of one of the two pipette tips 10 is inserted inside the other pipette tip 10 during the transport of the belt 30 and the dropping at the transport end point.

In other words, the pipette tip supply mechanism 100 of FIG. 1 is provided with an overlap eliminating unit 90 that eliminates the overlap of the pipette tip cluster 15 that exists in a state in which the tip of one of the two pipette tips 10 is inserted inside the other pipette tip 10. The overlap eliminating unit 90 is composed of an inclined belt 30 and a belt drive unit 40. In the pipette tip supply mechanism 100 of FIG. 1, even when the overlapped pipette tip cluster 15 is supplied onto the belt 30 in a state in which the tip of one of the two pipette tips 10 is inserted inside the other pipette tip 10, it is possible to eliminate the overlapping of the pipette tip cluster 15 by the overlap eliminating unit 90.

Second Embodiment

Next, a second embodiment will be described. In the second embodiment, unlike the above-described first embodiment in which the overlapping of the pipette tip cluster 15 is eliminated by the inclination of the belt 30 in which the pipette tip 10 is rotatable, a configuration in which a pipette tip contact unit 50 is provided that contacts the pipette tip cluster 15 to eliminate overlap will be described.

Figure 2A:
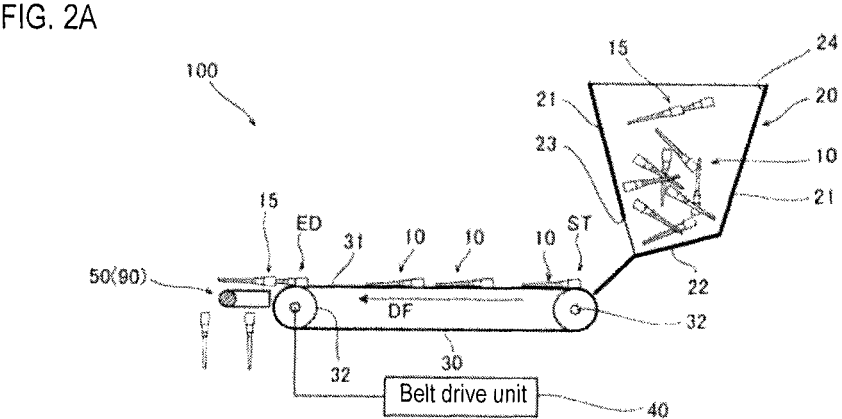
FIG. 2A is a schematic view of a pipette tip supply mechanism according to a second embodiment.

As shown in FIG. 2, the pipette tip supply mechanism 100 of the second embodiment includes a pipette tip storage unit 20, a belt 30, a belt drive unit 40, and a pipette tip contact unit 50. Note that in each of the figures after FIG. 2, the pipette tip 10 is schematically represented by a simple conical shape in some cases.

Regarding the second embodiment, the pipette tip storage unit 20, the belt 30, and the belt drive unit 40 can adopt the same configuration as in the first embodiment, so that the description of common contents will be omitted.

In the second embodiment, the belt 30 also may not be inclined upward in the transport direction DF. In the example of FIG. 2, the belt 30 is provided substantially horizontally. Although FIG. 2 shows an example of a belt 30 having a flat surface, in the second embodiment the belt 30 also may not be rotatable and rotatable about the longitudinal axis of the pipette tip 10.

The pipette tip contact unit 50 is provided so as to come in contact with the overlapping pipette tip cluster 15 in which one tip 11 of the two pipette tips 10 is inserted in the other. The pipette tip contact unit 50 eliminates overlapping of the pipette tip cluster 15 by contact. The pipette tip contact unit 50 is provided so as to come into contact with the pipette tip cluster 15 at the transport end point ED of the belt 30. In FIG. 2, the pipette tip contact unit 50 is disposed at a position on the downstream side of the transport end point ED in the transport direction DF and contacts the pipette tip cluster 15 dropping from the transport end point ED. That is, the pipette tip contact unit 50 is disposed at a position extended from the transport end point ED.

As described above, the pipette tip cluster 15 is naturally formed in the storage state and the transport process and is not in a fitted state, such that it is possible to apply a force for separating the two pipette tips 10 from each other to easily eliminate the pipette tip cluster 15. The pipette tip contact unit 50 may have any shape and material insofar as it can apply a force to separate the two pipette tips 10 from each other. The pipette tip contact unit 50 may be formed of metal or resin, for example.

Figure 2B:
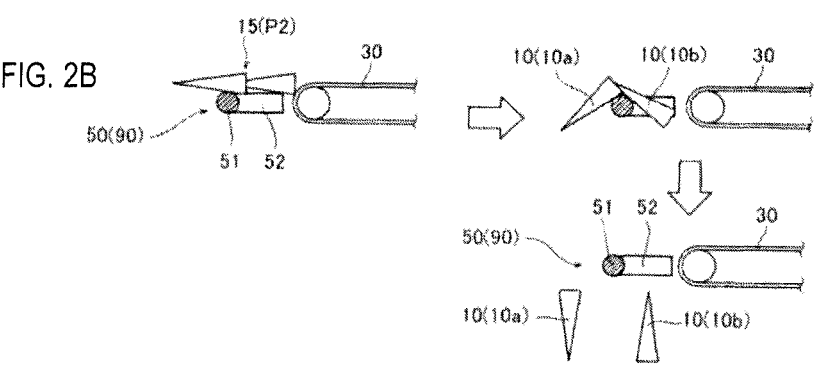
FIGS. 2B and 2C are schematic diagrams showing before and after separation of pipette tip clusters having different orientations.
Figure 2C:
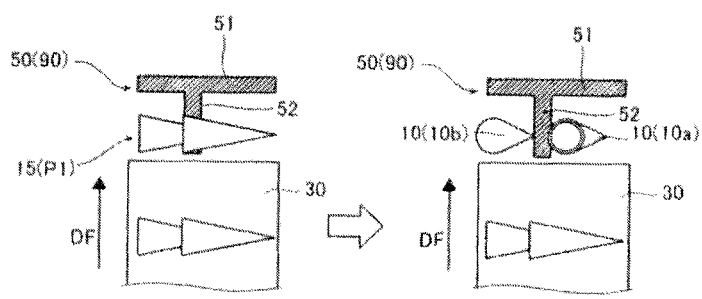

For example, in FIG. 2, the pipette tip contact unit 50 is a columnar member having a circular cross section. As shown in FIG. 2C, the pipette tip contact unit 50 has a T-shape in a plan view. That is, the pipette tip contact unit 50 includes a first part 51 along the width direction of the belt 30 orthogonal to the transport direction DF, and a second part 52 along the transport direction DF of the belt 30. As shown in FIG. 2B, the first part 51 is arranged at a position where it contacts when the pipette tip cluster 15 in the orientation P2 along the transport direction DF is sent out from the transport end point ED. As shown in FIG. 2C, the second part 52 is arranged at a position where the second part 52 comes into contact when the pipette tip cluster 15 in the orientation P1 along the width direction is sent from the transport end point ED.

Hereinafter, a pipette tip supply method by the pipette tip supply mechanism 100 will be described.

The pipette tip supply method of the second embodiment includes at least the following (1) to (3). (1) Multiple stored pipette tips 10 are supplied onto the belt 30. (2) The belt 30 is driven in the transport direction DF, and the pipette tip 10 on the belt 30 is transported. (3) At the transport end point ED of the belt 30, the pipette tip cluster 15, in which the tip of one of the two pipette tips 10 overlaps in a state of being inserted inside the other pipette tip 10, is brought into contact with the pipette tip contact unit 50, and the pipette tip cluster 15 is eliminated.

As shown in FIG. 2B, when the transported pipette tip cluster 15 is roughly along the transport direction DF and the pipette tip cluster 15 is sent out from the transport end point ED, the front side pipette tip 10a is first brought into contact with the first part 51 of the pipette tip contact unit 50. The pipette tip cluster 15 is caused to bend and separate at the connection point of the two pipette tips 10 by the action of the gravity at the time of dropping and the reaction force from the pipette tip contact unit 50 at the contact portion with the pipette tip contact portion 50.

As shown in FIG. 2C, when the pipette tip cluster 15 being transported is substantially along the width direction, one or another of the two pipette tips 10 contacts the second part 52 of the contact unit 50 when the pipette tip cluster 15 is sent out from the transport end point ED. The pipette tip cluster 15 is caused to bend at the connection point of the two pipette tips 10 by the action of the gravity at the time of dropping and the reaction force from the pipette tip contact unit 50 at the contact portion with the pipette tip contact portion 50.

In the pipette tip supply mechanism 100 and the pipette tip supply method according to the second embodiment described above, an external force for separating the two pipette tips 10 can be applied to the pipette tip cluster 15 to eliminate the overlapping of the pipette tip cluster 15 by bringing the transported pipette tip cluster 15 and the pipette tip contact unit 50 into contact with each other.

In other words, the pipette tip supply mechanism 100 of FIG. 2 is provided with an overlap eliminating unit 90 that eliminates the overlap of the pipette tip cluster 15 that exists in a state in which the tip of one of the two pipette tips 10 is inserted inside the other pipette tip 10. The overlap eliminating unit 90 is configured by a pipette tip contact unit 50. In the pipette tip supply mechanism 100 of FIG. 2, even when the overlapped pipette tip cluster 15 is supplied onto the belt 30 in a state in which the tip of one of the two pipette tips 10 is inserted inside the other pipette tip 10, it is possible to eliminate the overlapping of the pipette tip cluster 15 by the overlap eliminating unit 90.

Modification of Second Embodiment

Figure 3A:
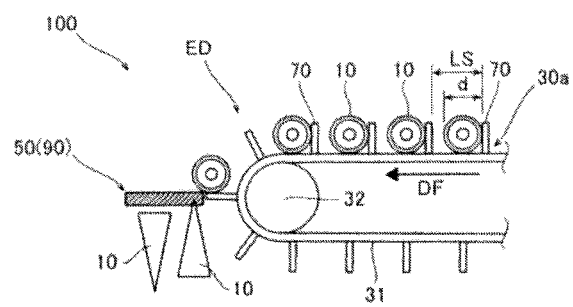
FIG. 3A is a schematic diagram of a modified example of the pipette tip supply mechanism of the second embodiment.

Although FIG. 2 shows an example of the belt 30 having a flat surface, in the pipette tip supply mechanism 100 of the second embodiment, the belt 30a is a blade-equipped belt in which the pipette tip 10 cannot rotate and roll around the longitudinal axis as shown in FIG. 3.

Specifically, the belt 30a has a plurality of blades 70 rising from the surface. The blades 70 extend linearly along the width direction of the belt 30a. The respective blades 70 are provided at a fixed interval LS in the transport direction DF of the belt 30a. The fixed interval LS is a size obtained by adding a predetermined margin to the maximum outer diameter d of the pipette tip 10. The fixed interval LS has a magnitude of $d<LS<2\times d$. Therefore, the pipette tips 10 supplied onto the belt 30a are maintained one by one between adjacent blades 70 in the orientation P1 along the width direction of the belt 30a which is partitioned by the blades 70. Since the pipette tip cluster 15 does not have a larger outer diameter d than a single pipette tip 10, when the pipette tip cluster 15 is supplied onto the belt 30a, the pipette tip cluster 15 is held between the adjacent blades 70 in the orientation P1 (see FIG. 3B) along the width direction of the belt 30a as in the case of one pipette tip 10. Note that in the example of FIG. 3 the rolling rotation of the pipette tip 10 is obstructed by the blades 70.

In the example of FIG. 3, the pipette tip contact unit 50 has a columnar shape extending from the transport end point ED of the belt 30a in the transport direction DF. The pipette tip contact unit 50 is provided at a position where it comes into contact with the pipette tip cluster 15 in the lateral orientation P1 delivered from the belt 30a at the transport end point ED.

Figure 3B:
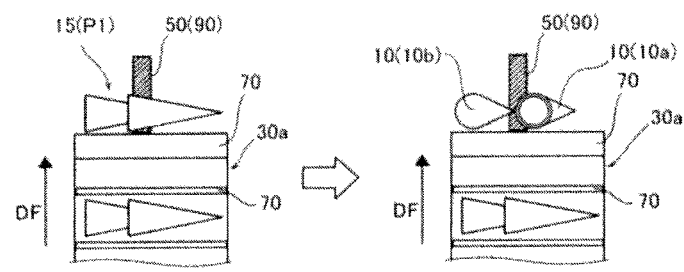
FIG. 3B is a schematic diagram showing before and after separation of the pipette tip cluster.

As shown in FIG. 3B, the action of eliminating the overlap of the pipette tip cluster 15 by the pipette tip contact unit 50 in the modified example is the same as in FIG. 2C. In the example of FIG. 3, since the pipette tip 10 and the pipette tip cluster 15 are aligned in the lateral orientation P1 by the belt 30a which is a blade-equipped belt, the first part 51 shown in FIG. 2C is not required on the pipette tip contact unit 50.

Third Embodiment

Next, a third embodiment will be described. The third embodiment is a configuration combining the first embodiment described above in which the overlapping of the pipette tip cluster 15 is eliminated by the inclination of the belt 30 on which the pipette tip 10 can roll and rotate, and the second embodiment in which the pipette tip contact unit 50 is provided to make contact with the pipette cluster 15 to eliminate the overlap.

Regarding the third embodiment, the pipette tip storage unit 20, the belt 30, and the belt drive unit 40 may use the same configuration as in the first embodiment. The pipette tip contact unit 50 also may have the same structure as that of the second embodiment.

Figure 4:
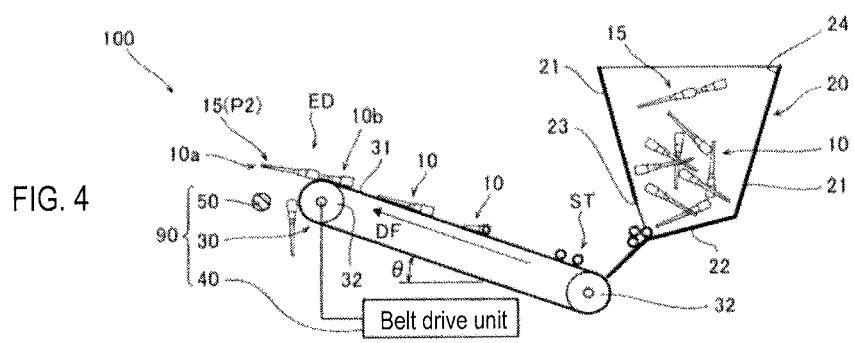
FIG. 4 is a schematic diagram of a pipette tip supply mechanism according to a third embodiment.

In the pipette tip supply mechanism 100 of the third embodiment shown in FIG. 4, the belt (30) is inclined upwards toward the transport direction DF so that the pipette tip (10) is rotatable around a longitudinal axis of the pipette tip on a surface of the belt (30) and the tapered pipette tip (10) is rolled to align the longitudinal axis of the pipette tip along the transport direction DF in conjunction with the drive of the belt in the transport direction DF.

In the example of FIG. 4, the pipette tip supply mechanism 100 is provided with a pipette tip contact unit 50 for making contact with the overlapping pipette tip cluster 15 in a state in which one end of the two pipette chips 10 is inserted inside the other pipette tip 10 at the transport end point ED of the belt 30 to eliminate the overlap of the pipette tip cluster 15. In the case of the example of FIG. 4, the pipette tip contact unit 50 is provided so as to extend along the width direction of the belt 30 to come into contact with the pipette cluster 15 since the pipette tip cluster 15 is controlled so that its longitudinal axis is in the orientation P2 along the transport direction DF.

In this way, the pipette tip supply mechanism 100 of FIG. 4 is provided both with a configuration of the belt 30 is inclined upwards toward the transport direction DF so that the pipette tip is rotatable around a longitudinal axis of the pipette tip on a surface of the belt and the pipette tip aligns the longitudinal axis of the pipette tip along the transport direction DF in conjunction with the drive of the belt 30 in the transport direction DF, and a configuration in which a pipette tip contact unit 50 that contacts the pipette tip cluster 15 at the transport end point ED of the belt 30 eliminates overlapping of the pipette tip cluster 15. At the transport end point ED of the belt 30, the pipette tip supply mechanism 100 brings the overlapped pipette tip cluster 15 into contact with the pipette tip contact unit 50 in a state in which one end of the two pipette chips 10 is inserted inside the other pipette tip and eliminates the overlap of the pipette tip cluster 15.

Therefore, in the example of FIG. 4, the overlap of the pipette tip cluster 15 is eliminated during transport by the pipette tip 10a on the front side of the pipette chip mass 15 in the orientation P2 along the transport direction DF on the inclined belt 30 being transported so as to precede the pipette tip 10b by the difference in frictional force. also Since the pipette tip cluster 15 is in the orientation P2 along the transport direction DF, the overlap of the pipette tip cluster 15 is eliminated by making the drop timing of the front pipette tip 10a different from the drop timing of the rear side pipette tip 10b. At the transport end point ED, the overlap of the pipette tip cluster 15 also is eliminated by applying an external force for separating the pipette tip 10 by contact between the pipette tip cluster 15 and the pipette tip contact unit 50.

In the example of FIG. 4, since the orientation of the pipette tip cluster 15 on the belt 30 can be controlled along the transport direction DF by the upwardly inclined belt 30, it is possible to equalize the orientation of the pipette tip cluster 15 in contact with the pipette tip contact unit 50 to the orientation P1 along the transport direction DF. External force for separating the two pipette tips 10 by the pipette tip contact unit 50 can be exerted on the pipette tip cluster 15 with more certainty since the attitude of the pipette tip cluster 15 can be equalized to the orientation P1.

Comparing to the structure of FIG. 3, an external force is exerted on the pipette tip 10 by the blade 70 moving together with the belt 30a in the blade—equipped belt 30a. Therefore, there is a possibility that the pipette tip 10 pushed by the blade 70 may be deformed if there is a case where the tip 11 of the pipette tip 10 is caught in the transporting process and does not move or there is a place that is easily jammed. Contrastingly, in the configuration of FIG. 4 as in the first embodiment, an unnecessary external force is not applied to the pipette tip 10 in order to control the orientation of the pipette tip 10 using the rolling rotation of the pipette tip 10 on the upwardly inclined belt 30. Therefore, deformation of the pipette tip 10 during the transfer process can be suppressed effectively.

Position of Pipette Tip Contact Unit

Next, the position of the pipette tip contact unit 50 will be described in detail. In FIG. 4, the pipette tip contact unit 50 is provided at a position away from the belt 30 on the downstream side in the transport direction DF at the transport end point ED. The pipette tip contact unit 50 also is disposed at a position where it can come into contact with the pipette tip cluster 15 dropping from the belt 30 at the transport end point ED. That is, the pipette tip contact unit 50 is not disposed above the extension line of the belt 30.

Figure 5:
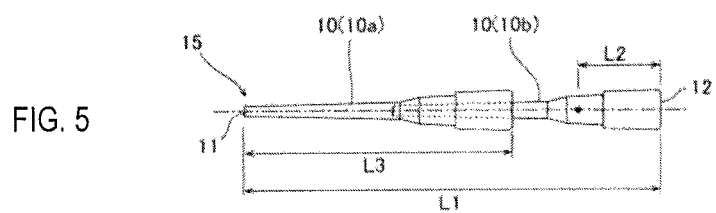
FIG. 5 is a view illustrating a first distance, a second distance, and a third distance.
Figure 6:
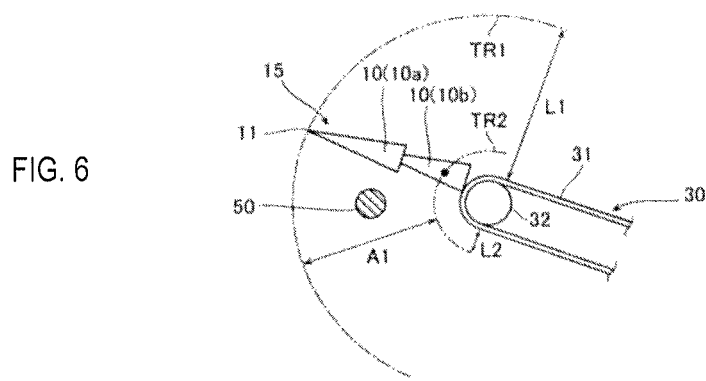
FIG. 6 is a schematic diagram illustrating a position of a pipette tip contact unit.

Here, the length in the longitudinal direction of the pipette tip cluster 15 is defined as a first distance L1 (see FIG. 5), and the length from the rear end 12 opposite to the tip end 11 of one pipette tip 10 to the center of gravity is defined as a second distance L2 (see FIG. 5). In FIG. 6, the pipette tip contact unit 50 is disposed at a position that is closer to the first distance L1 than the second distance L2 from the transport end point ED of the belt 30.

Note that the distance from the transport end point ED of the belt 30 is the distance in the normal direction extended from the surface 31 of the belt 30. For example, a position separated by the first distance L1 is a locus TR1 (refer to a one-dotted chain line) connecting the points separated by the first distance L1 in the normal direction from the surface 31 of the belt 30 curving along the pulley 32 at the transport end point ED. Therefore, the pipette tip contact unit 50 is located in the range A1 between the locus TR1 at the first distance L1 from the surface 31 of the belt 30 at the transport end point ED and the locus TR2 at the second distance L2 from the surface 31 of the belt 30.

When the pipette tip contact unit 50 is provided at a position at a distance equal to or greater than the first distance L1 from the belt 30, there is a possibility that the pipette tip cluster 15 will not contact the pipette tip contact unit 50. When the pipette tip contact unit 50 also is provided at a position at a distance equal to or less than the second distance L2 from the belt 30, there is a possibility that no external force to separate the pipette tip cluster 15 will act thereon and the pipette tip cluster 15 will drop intact. Therefore, it is possible to bring the pipette tip contact unit 50 and the pipette tip cluster 15 into contact with each other, that is, an external force for separating the two pipette tips 10 can be applied to the pipette tip cluster 15 by disposing the pipette tip contact unit 50 in the range A1 which is closer to the first distance L1 than the second distance L2 from the transport end point ED of the belt 30.

Figure 7:
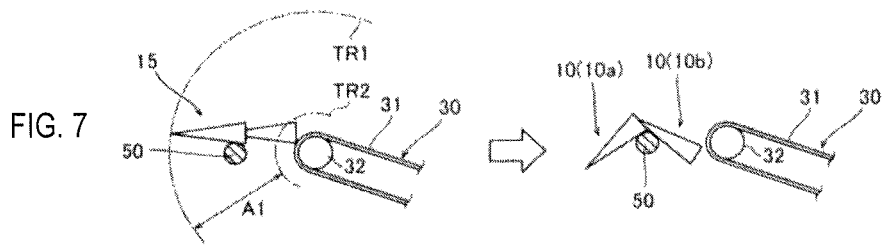
FIG. 7 is a schematic view illustrating a first example of a deployment position of a pipette tip contact unit.

In the example of FIG. 7, the pipette tip contact unit 50 is disposed at an intermediate position within the range of the range A1. In this case, the pipette tip contact unit 50 comes into contact with the vicinity of the connection point of the two pipette tips 10 in the pipette tip cluster 15. The pipette tip contact unit 50 separates the pipette tips 10 by applying an external force so as to bend the pipette tip cluster 15 at the boundary of the contact unit.

Figure 8:
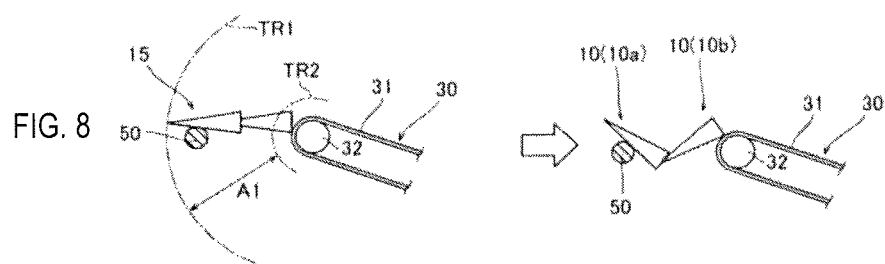
FIG. 8 is a schematic view illustrating a second example of the deployment position of the pipette tip contact unit.

In the example of FIG. 8, the pipette tip contact unit 50 is disposed at a position on the far side from the belt 30 within the range of the range A1. In this case, the pipette tip contact unit 50 contacts the vicinity of the leading end of the pipette tip cluster 15. The pipette tip contact unit 50 applies an external force so as to support the vicinity of the distal end of the pipette tip cluster 15 at the contact unit. As a result, the pipette tip cluster 15 is separated into two pipette tips 10 so as to be bent at the connection point by its own weight.

Figure 9:
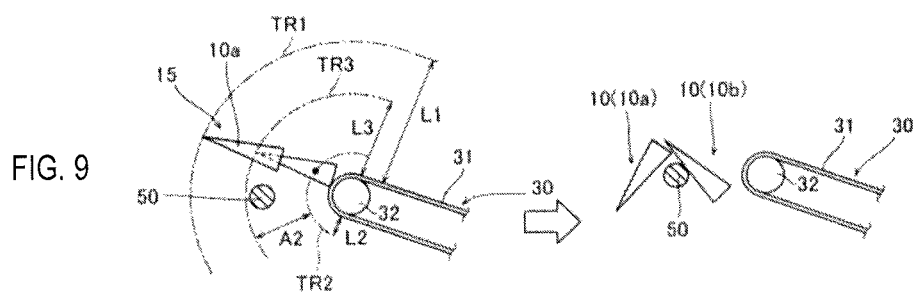
FIG. 9 is a schematic view illustrating a third example of the arrangement position of the pipette tip contact unit.

Here, the length in the longitudinal direction of one pipette tip 10 is defined as the third distance L3 (see FIG. 5). As shown in FIG. 9, the pipette tip contact unit 50 is preferably arranged at a position closer to the third distance L3 from the transport end point ED of the belt 30. That is, the pipette tip contact unit 50 is located in a range A2 between the locus TR3 at the third distance L3 from the surface 31 of the belt 30 at the transport end point ED and the locus TR2 at the second distance L2 from the surface 31 of the belt 30. This makes it possible to have the pipette tip cluster 15 and the pipette tip contact unit 50 come into contact more reliably as compared to when the pipette tip contact unit 50 is located at a position farther than the third distance L3 shown in FIG. 8. In the example of FIG. 9, at least the front pipette tip 10a of the pipette tip cluster 15 can be brought into contact with the pipette tip contact unit 50. Therefore, it is possible to apply an external force for separating the two pipette tips 10 by folding the pipette tip cluster 15 between the front and rear pipette tips 10.

Figure 10A:
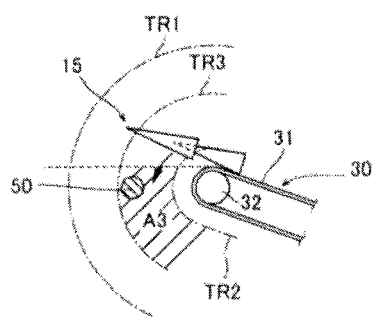
FIG. 10A shows an example in which the pipette tip contact unit is located lower than the upper surface of the belt.

It also is preferable that the pipette tip contact unit 50 is arranged at a position lower than the belt upper surface at the transport end point ED of the belt 30. Note that the upper surface of the belt 30 at the transport end point ED may be regarded as the highest point of the upwardly inclined belt 30. Therefore, as shown in FIG. 10A, it is preferable that the pipette tip contact unit 50 is arranged in a range A3 which is lower than the upper surface of the belt at the transport end point ED in the range A1 or the range A2. In FIG. 10A, the pipette tip cluster 15 comes into contact with the pipette tip contact unit 50 in the process of dropping from the transport end point ED.

Figure 10B:
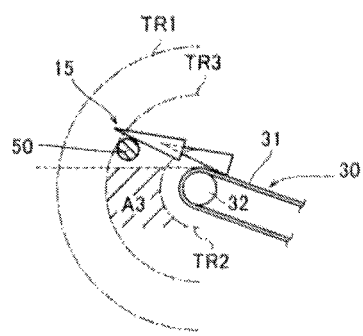
FIG. 10B shows an example in which the pipette tip contact unit is located higher than the upper surface of the belt.

By disposing the pipette tip contact unit 50 in a range A3 lower than the upper surface of the belt at the transport end point ED, an external force for separating the two pipette tips 10 is effected by utilizing the movement of the pipette tip cluster 15 dropping from the belt 30. For example, as shown in FIG. 10B, although there is a possibility that the pipette tip cluster 15 directly straddles the pipette tip contact unit 50 and becomes stable when the pipette tip contact unit 50 is on the extended line of the upper surface of the belt, it is possible to eliminate the overlap of the pipette tip cluster 15 more reliably by utilizing momentum.

Modification of Belt Conveyor

Figure 11:
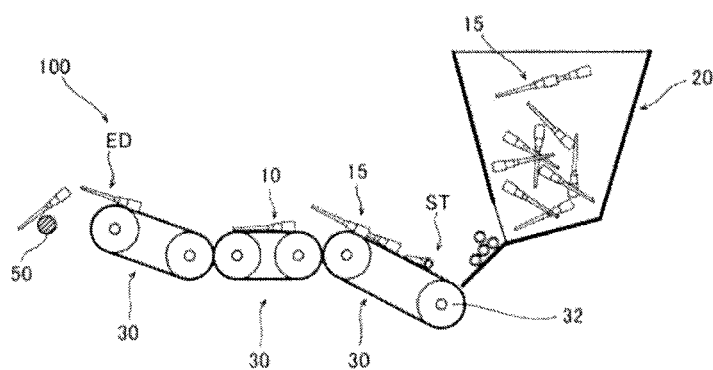
FIG. 11 is a schematic diagram showing a modified example of a pipette tip supply mechanism.

Although FIG. 1 to FIG. 10 show an example in which a single belt conveyor is configured by a belt 30 and a pair of pulleys 32, FIG. 11 shows an example in which a plurality of belt conveyors configured by a belt 30 and a pair of pulleys 32 are provided. The pipette tip supply mechanism 100 may be configured to include such a plurality of belts 30. The inclined belt 30 also may include a portion that is partially horizontal.

However, as shown in FIG. 1, it is preferable that the belt 30 is inclined so as to be higher from the opening 23 of the pipette tip storage unit 20 from which the pipette tip 10 is supplied to the transport start point ST toward the transport end point ED. It is preferable at a minimum that the belt 30 does not have a portion which is inclined downward in the transport direction DF. There is a possibility that the direction of the pipette tip cluster 15 may change in the opposite direction if there is a lower location during transport. According to the configuration in which the belt 30 is inclined so as to be higher from the transport start point ST toward the transport end point ED, such that the height monotonically increases toward the transport end point ED and the pipette tip mass 15 can be controlled so that the tip of the pipette tip clusters 15 faces the transport end point ED.

In the examples shown in FIGS. 1, 2, 4, and 11, the surface 31 on which the pipette tip 10 of the belt 30 is disposed is a flat surface without substantial unevenness. In this way, the pipette tip cluster 15 and the belt 30 do not engage with each other unlike the bladed belt and the belt with a crosspiece in which an uneven portion is engaged with the object to be transported, such that is possible to more easily control the direction by rolling and rotating the tip cluster 15. Note that if the surface 31 on which the pipette tip 10 is disposed is a flat surface, an engaging groove or the like engaging with the pulley 32 may be provided on the reverse surface on the side in contact with the pulley 32.

Figure 12A:
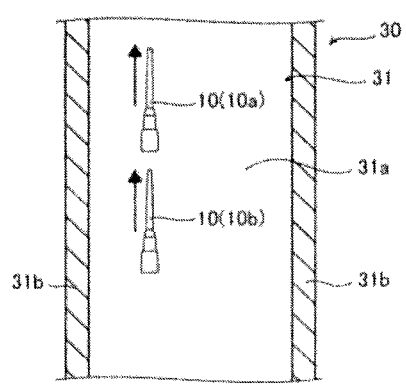
FIG. 12A is a schematic plan view and FIG. 12B is a schematic side view showing modified examples of the belt.

The surface 31 of the belt 30 on which the pipette tip 10 is disposed is a flat surface having no substantial unevenness in the central portion in the width direction, and may have unevenness at the end portions in the width direction. For example, in the example shown in FIG. 12A, a flat surface part 31a having no substantial unevenness is formed at the center in the width direction on the surface 31 of the belt 30, and a convex part 31b is formed at both ends in the width direction. Portions of the convex part 31b are shown as hatched in FIG. 12. In this way, the convex part 31b at both end portions come into contact with the pipette tip 10 to suppress the rotation of the pipette tip 10 when the pipette tip 10 rolls and rotates on the surface 31. As a result, it is possible to prevent the pipette tip 10 from dropping from the end portion in the width direction of the belt 30.

Figure 12B:
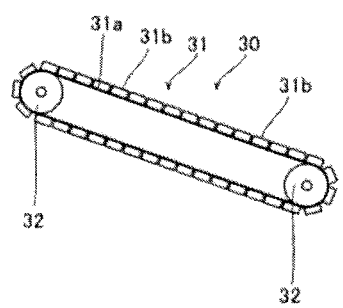

In this case, it is preferable that the flat surface part 31a has a width equal to or larger than the length L1 in the longitudinal direction of the pipette tip cluster 15. The convex part 31b may have a projecting height that can suppress the rotation of the pipette tip 10 as compared with the flat surface part 31a. As shown in FIG. 12B, the convex part 31b may have a rib shape with a projecting height such that the pipette tip 10 rolling and rotating cannot overcome it. In this case, it is possible to more effectively prevent the pipette tip 10 from dropping from the end in the width direction of the belt 30.

Specific Configuration Example of Pipette Tip Supply Mechanism

Next, a specific configuration example of the pipette tip supply mechanism 100 according to the third embodiment will be described with reference to FIG. 13. In the specific configuration example, an example will be described in which the pipette tip supply mechanism 100 is incorporated as a part of the sample analyzer 500 and provided as a unit for supplying the pipette tip 10 to a sample dispensing unit 520 which is described later.

Summary of Sample Analyzer

The sample measuring apparatus 500 is an apparatus for analyzing a measurement sample prepared by adding a predetermined reagent to a sample collected from a subject.

The subject is mainly a human, but it may be another animal other than a human. The sample analyzer 500 performs analysis for clinical examination or medical research of, for example, a sample taken from a patient. The sample is a living body-derived specimen. The sample derived from a living body is, for example, blood (whole blood, serum or plasma) collected from a subject or a liquid obtained by subjecting blood to a predetermined pretreatment.

Figure 13:
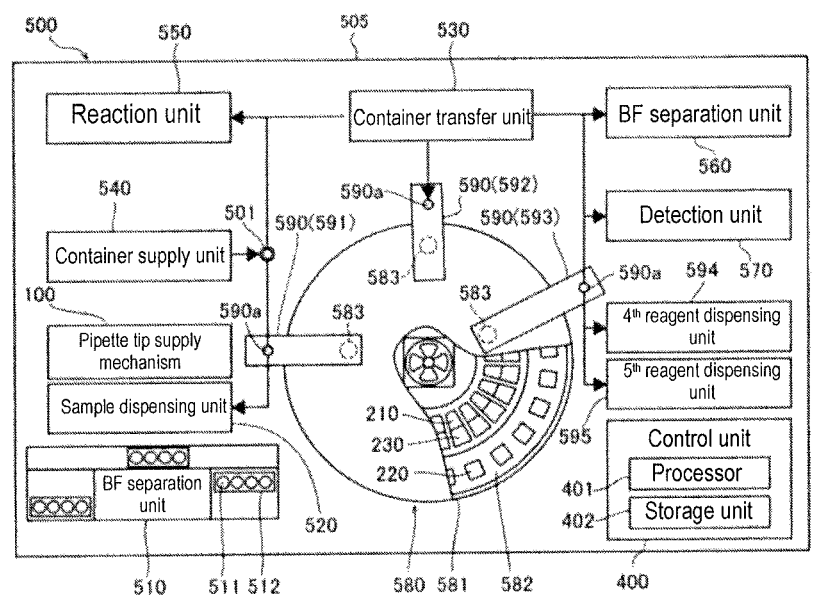
FIG. 13 is a view illustrating a sample analyzer having a pipette tip supply mechanism.

As a specific example, in FIG. 13, the sample analyzer 500 is an immunoassay device that detects a target substance in a sample using an antigen-antibody reaction. The sample is serum or plasma.

The sample analyzer 500 forms a complex in which a target substance, a magnetic particle that binds to the target substance, and a labeling substance that binds to the target substance are bound, and then detects the target substance based on the label of the labeling substance contained in the complex. For example, the sample analyzer 500 prepares a sample for measurement including a target substance, magnetic particles, and a labeling substance by adding predetermined one or more kinds of reagents to the sample. At this time, the pipette tip 10 is used for suctioning the sample from the sample container and for discharging the suctioned sample into the reaction container.

The labeling substance binds to the target substance by an antigen-antibody reaction and contains a detectable label. The labeling substance is not particularly limited insofar as it is an antibody containing a known label. When a capture substance is used, the labeling substance may be bound to the capture substance. For example, an enzyme, a fluorescent substance, a radioactive isotope and the like may be used as the label contained in the labeling substance. Examples of the enzyme include alkaline phosphatase (ALP), peroxidase, glucose oxidase, tyrosinase, acid phosphatase and the like. Examples of fluorescent substances include fluorescein isothiocyanate (FITC), green fluorescent protein (GFP), luciferin and the like. Examples of radioactive isotopes include 125I, 14C, 32P and the liked.

When the label is an enzyme, a known substrate may be appropriately selected according to the enzyme to be used as the substrate for the enzyme of the labeling substance. Examples of chemiluminescent substrates when alkaline phosphatase is used as an enzyme include CDP-Star (registered trademark), (4-chloro-3-(methoxyspiro [1,2-dioxetane-3,2'-(5'-chloro) tricyclo [3.3.1.13,7] decane]-4-yl) phenyl phosphate), CSPD® (3-(4-methoxyspiro {1,2-dioxetane-3,2-(5'-chloro) tricyclo [3.3.1.13,7] decane}-4-yl) phenyl phosphate); luminescent substrates such as p-nitrophenyl phosphate, 5-bromo-4-chloro-3-indolyl phosphate (BCIP), 4-nitro blue tetrazolium chloride (NBT), iodonitrotetrazolium (INT); luminescent substrates such as 4-methyl umbellyphenyl phosphate (4 MUP); and chromogenic substrates such as 5-bromo-4-chloro-3-indolyl phosphate (BCIP), 5-bromo-6-chloro-indolyl phosphate disodium and p-nitrophenylphosphorus.

For example, when the label used for the labeling substance is an enzyme, light, color, and the like generated by reacting the substrate with the enzyme are measured. A spectrophotometer, a luminometer, or the like can be used as the detection unit in this case. When the labeling substance is a radioactive isotope, a scintillation counter or the like can be used as the detection unit.

Structure of Sample Analyzer

As shown in FIG. 13, the sample analyzer 500 includes a sample transport unit 510, a sample dispensing unit 520, and a pipette tip supply mechanism 100. The sample analyzer 500 also includes a container transfer unit 530, a container supply unit 540, a reaction unit 550, a BF separation unit 560, a detection unit 570, a reagent cooler 580, and a reagent dispensing unit 590. The sample analyzer 500 also includes a controller 400 for controlling the above-described components and a housing 505.

The housing 505 has a box-like shape capable of accommodating each part of the sample analyzer 500 therein. The housing 505 also may have a structure that houses each part of the sample analyzer 500 on a single hierarchy or a hierarchical structure in which a plurality of hierarchies are provided in the vertical direction, and each part of the sample analyzer 500 may be allocated to a respective layer.

The sample transport unit 510 is configured to transport the sample collected from the donor to the suction position by the sample dispensing unit 520. The sample transport unit 510 can transport a rack 512, in which a plurality of sample containers 511 containing samples are installed, to a predetermined sample suction position.

Figure 14:
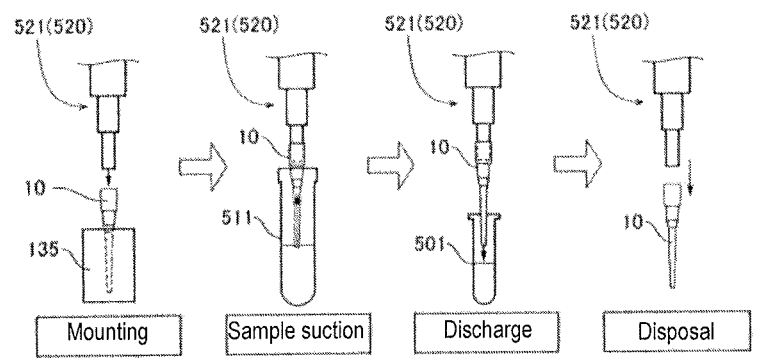
FIG. 14 is a diagram illustrating mounting of a pipette tip, suction and discharge of a sample.

The sample dispensing unit 520 suctions the sample transported by the sample transport unit 510, and dispenses the suctioned sample into a reaction container 501. As shown in FIG. 14, the sample dispensing unit 520 includes a dispensing nozzle 521 connected to a fluid circuit for suctioning and discharging, and a moving mechanism (not shown) for moving the dispensing nozzle 521. The sample dispensing unit 520 attaches the pipette tip 10 supplied from the pipette tip supply mechanism 100 to the leading end of the dispensing nozzle 521, and suctions a predetermined amount of the sample in the transported sample container 511 into the pipette tip 10. The sample dispensing unit 520 dispenses the sample suctioned into the pipette tip 10 to the reaction container 501 disposed at a predetermined sample dispensing position. After dispensing, the sample dispensing unit 520 removes and discards the pipette tip 10 from the tip of the dispensing nozzle 521.

Returning to FIG. 13, the pipette tip supply mechanism 100 stores a large number of pipette tips 10 put by the user in the pipette tip storage unit 20, and the stored pipette tips 10 are separated one by one and sequentially supplied to the sample dispensing unit 520. The detailed structure of the pipette tip supply mechanism 100 will be described later.

The container supply unit 540 can store a plurality of unused reaction containers 501. The container supply unit 540 can supply unused empty reaction containers 501 one by one to the container transfer unit 530 at a predetermined container supply position.

The container transfer unit 530 can transfer the reaction container 501. The container transfer unit 530 acquires an empty reaction container 501 from the container supply position and supplies the empty reaction container 501 to the processing positions of the sample dispensing unit 520, the reaction unit 550, the BF separation unit 560, the detection unit 570, the reagent dispensing unit 590, and the like. The container transfer unit 530 is configured by, for example, a holding unit having a catcher for holding the reaction container 501 or an installation hole of the reaction container 501, and a moving mechanism for moving the catcher or holding unit. The moving mechanism can move in three orthogonal axial directions, for example, in the vertical directions and in the horizontal directions. One or more of the container transfer units 530 are provided in accordance with the arrangement of the processing positions of the sample dispensing unit 520, the reaction unit 550, the detection unit 570, the reagent dispensing unit 590 and the like in the housing 505.

The reaction unit 550 includes a heater and a temperature sensor, and holds the reaction container 501 to heat the sample contained in the reaction container 501 for reaction. The sample and the reagent contained in the reaction container 501 react by heating. One or more reaction units 550 are provided in the housing 505. The reaction unit 550 may be fixedly provided in the housing 505 or may be provided movably in the housing 505. When the reaction unit 550 is configured to be movable, the reaction unit 550 may also function as a part of the container transfer unit 530.

In the example of FIG. 13, the reagent cooler 580 has a container holding unit 582 and a cooling mechanism in a case 581. The container holding unit 582 holds the reagent container. The cooling mechanism keeps the reagent in the reagent container at a constant temperature suitable for storage. The case 581 includes a heat insulating material, and insulates the inside and the outside of the case 581. In this way the reagent container can be stored cold. The reagent cooler 580 has a plurality of holes 583 through which the reagent dispensing unit 590 enters the inside of the reagent cooler 580.

A plurality of circumferentially arranged rows of reagent containers can be arrayed concentrically in a radial direction in the container holding unit 582. The container holding unit 582 can independently rotate a plurality of concentric circular rows of reagent containers in the circumferential direction. The positions of the plurality of holes 583 in the radial direction are different so as to correspond to any one of the rows of concentrically arranged reagent containers. In this way the container holding unit 582 holds the desired reagent container selected from among the rows of the corresponding reagent containers at positions immediately below each of the plurality of holes 583 provided according to the reagent dispensing unit 590. As a result, the reagent in the reagent container arranged at the position directly below the hole 583 is suctioned by the reagent dispensing unit 590. Reagent containers 210, 220, and 230 that contain R1 reagent, R2 reagent, and R3 reagent, respectively, and which will be described later, are set in the container holding unit 582, respectively.

The reagent dispensing unit 590 can suction the reagent in the reagent container and dispense the suctioned reagent into the reaction container 501. The reagent dispensing unit 590 can move the pipette 590a for suctioning and discharging the reagent horizontally between the hole 583 and a predetermined reagent dispensing position. The reagent dispensing unit 590 also can move the pipette 590a in the vertical direction, pass through the hole 583 from above the hole 583 to enter the inside of the reagent container and retreat from the inside thereof. The pipette 590a is connected to a fluid circuit (not shown), suctions a predetermined amount of reagent from the reagent container of the container holding unit 582, and dispenses the reagent to the reaction container 501 transferred to the reagent dispensing position.

Three reagent dispensing units 590 are provided, for example, for dispensing each of the R1 reagent to the R3 reagent. Multiple kinds of reagents also may be dispensed by one reagent dispensing unit 590. In the example of FIG. 13, the reagent dispensing unit 590 includes a first reagent dispensing unit 591 for dispensing the R1 reagent in the reagent container 210, a second reagent dispensing unit 592 for dispensing the R2 reagent in the reagent container 220, and a third reagent dispensing unit 593 for dispensing the R3 reagent in the reagent container 230. The reagent dispensing unit 590 includes a fourth reagent dispensing unit 594 for dispensing R4 reagent and a fifth reagent dispensing unit 595 for dispensing R5 reagent.

The first reagent dispensing unit 591 can move the pipette 590a between a hole 583 for suctioning the R1 reagent from the reagent container 210 containing the R1 reagent and a predetermined R1 reagent dispensing position. The second reagent dispensing unit 592 can move the pipette 590a between the hole 583 for suctioning the R2 reagent from the reagent container 220 containing the R2 reagent and a predetermined R2 reagent dispensing position. The third reagent dispensing unit 593 can move the pipette 590a between the hole 583 for suctioning the R3 reagent from the reagent container 230 containing the R3 reagent and the predetermined R3 reagent dispensing position. The fourth reagent dispensing unit 594 and the fifth reagent dispensing unit 595 are provided at positions separated from the reagent cooler 580. The fourth reagent dispensing unit 594 and the fifth reagent dispensing unit 595 are connected to a reagent container (not shown) containing the R4 reagent and the R5 reagent, respectively, via a liquid delivery tube, and the reagent can be discharged into the reaction container 501 transported by the container transfer unit 530.

The BF separation unit 560 has a function of executing a BF separation process for separating a liquid phase and a solid phase from the reaction container 501. In the sample analyzer 500, one or a plurality of BF separation units 560 are provided. The BF separation unit 560 suctions the liquid component in the reaction container 501 and supplies a cleaning liquid after having collected the magnetic particles of a complex in which a test substance, a magnetic particle which binds to the test substance, and a labeling substance which binds to the test substance are bound. In this way unnecessary substances contained in the liquid component can be separated from the magnetic particles and removed.

The detection unit 570 includes a photodetector such as a photomultiplier. The detection unit 570 measures the amount of antigen contained in the sample by acquiring the light generated in the process of reaction between the luminescent substrate and the labeled antibody that binds to the antigen of the sample subjected to various treatments with a photodetector.

The control unit 400 includes a processor 401 such as a CPU and a storage unit 402 such as a ROM, a RAM, and a hard disk. The processor 401 functions as a control unit of the sample analyzer 500 by executing a control program stored in the storage unit 402. The control unit 400 controls the operation of each part of the above-described sample analysis apparatus 500 including the pipette tip supply mechanism 100.

Detailed Structure of Pipette Tip Supply Mechanism

Next, a structural example of the pipette tip supply mechanism 100 in the sample analysis apparatus 500 will be described in detail with reference to FIGS. 15 to 21.

Figure 15:
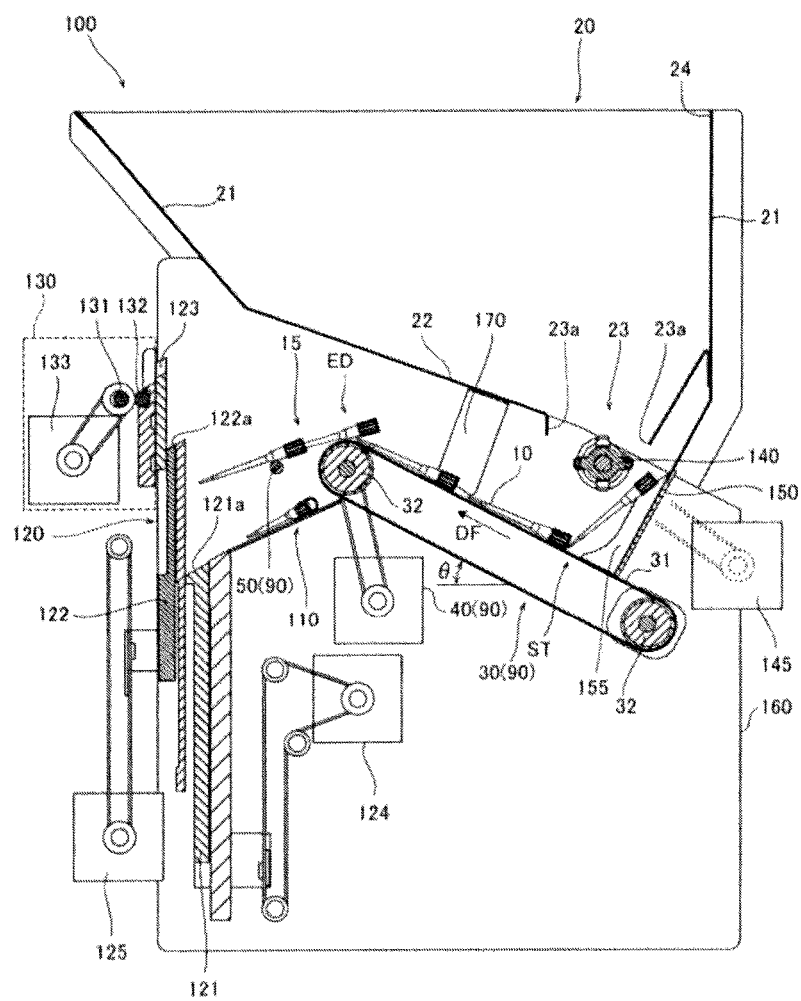
FIG. 15 is a vertical cross-sectional view showing a specific configuration example of a pipette tip supply mechanism.

In the structural example of FIG. 15, the pipette tip supply mechanism 100 includes a pipette tip storage unit 20, a belt 30, a belt drive unit 40, and a pipette tip contact unit 50. In FIG. 15, the pipette tip supply mechanism 100 also includes a receiving unit 110, a cutout part 120, and a delivery mechanism 130.

Pipette Tip Storage Unit

The pipette tip storage unit 20 is disposed at the uppermost part of the pipette tip supply mechanism 100. The pipette tip storage unit 20 has a box shape having a bottom surface 22 and a side surfaces 21 configuring four side surfaces, and has a storage space in which a plurality of pipette tips 10 can be stored inside the side surface s21 and the bottom surface 22. The upper part of the pipette tip storage unit 20 is an opened upper opening 24. The user can insert the pipette tip 10 from the upper opening 24. The upper opening 24 is covered with an openable/closable lid (not shown) provided in the housing 505 of the sample analyzer 500, and is opened when the pipette tip 10 is put in.

The pipette tip storage unit 20 has an opening 23 for supplying the pipette tip 10 to the belt 30. The opening 23 is provided in the bottom surface 22 of the pipette tip storage unit 20. The bottom surface 22 is provided at a position immediately above the belt 30, and an opening 23 is formed in a bottom surface 22 disposed above the belt 30. The opening 23 is provided at a position directly above the supply position which is the transport start point ST of the belt 30. The bottom surface 22 is formed as an inclined surface which is inclined downward toward the opening 23. Therefore, the stored pipette tip 10 moves toward the opening 23. The opening 23 has an opening width substantially equal to the width of the belt 30.

In the structural example of FIG. 15, the pipette tip supply mechanism 100 includes a rotating roller 140 provided in the opening 23 of the pipette tip storage unit 20, and a roller drive unit 145 for driving the rotating roller 140.

The rotating roller 140 is arranged in the opening 23 so as to close a part of the opening 23. A gap through which the pipette tip 10 can pass is formed between the rotating roller 140 and the edge portion of the opening 23. The pipette tip 10 in the pipette tip storage unit 20 is caught by the rotating roller 140 at the opening 23 and held so as to be blocked. The roller drive unit 145 is, for example, an electric motor. The roller drive unit 145 rotates the rotating roller 140 around a central axis. By the rotation, the pipette tip 10 caught by the rotating roller 140 is churned, passes through the gap, and drops to the supply position on the belt 30.

In this way it is possible to control the number of the pipette tips 10 supplied from the opening 23 by controlling the drive amount of the rotating roller 140. As a result, it is possible to prevent the overlapping of the pipette tip cluster 15 from becoming difficult to eliminate or becoming easy to clog due to excessive supply of the pipette tip 10 onto the belt 30. The drive amount of the rotating roller 140 by the roller drive unit 145 is controlled by the control unit 400 so that, for example, about 1 to 5 pipette tips 10 drop onto the belt 30 at a time.

Figure 16:
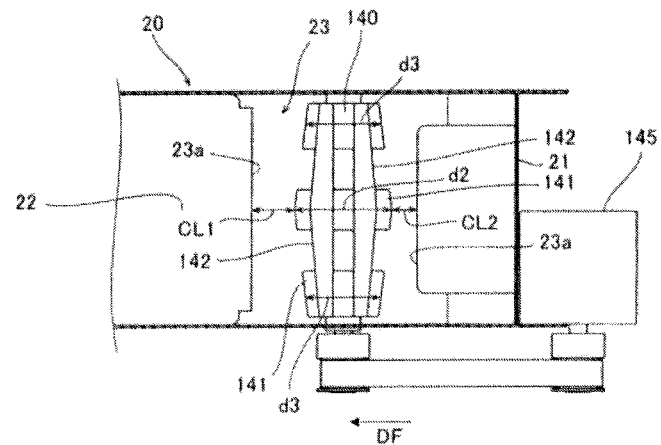
FIG. 16 is an enlarged plan view showing the rotating roller of FIG. 15.

As shown in FIG. 16, the rotating roller 140 has a projection 141 on its surface. That is, the rotating roller 140 includes a columnar part 142 having a circular cross unit and a projection 141 projecting radially outward from the surface of the columnar part 142.

In the portion where the protrusion 141 is provided, the rotation radius of the rotating roller 140 becomes larger than the position where the protrusion 141 is not provided, and the churning ability of the pipette tip 10 when the rotating roller 140 is rotated is increased. Therefore, it is possible to easily churn the pipette tips 10 gathered in the vicinity of the opening 23 in the pipette tip storage unit 20 by rotationally driving the rotating roller 140 to easily eliminate the engagement state between the pipette tips 10. That is, since the pipette tip 10 is flexible, in the pipette tip storage unit 20, various pipette tip clusters 15 in which the two pipette tips 10 are stuck together as well as various engagement states can occur. In the rotating roller 140 having the protrusion 141, the aggregate of the engaged pipette tips 10 can be effectively loosened and dispersed.

In the example of FIG. 16, the rotating roller 140 is disposed at a position where a gap through which the pipette tip 10 can pass is formed on both sides of the rotating roller 140 in plan view in the opening 23. The rotating roller 140 is biased to one side at the substantially central portion of the opening 23 so that the size of the gap between the rotating roller 140 and the opening edge portion 23a differs between the gap CL1 on one side and the gap CL2 on the other side. The roller drive unit 145 rotationally drives the rotating roller 140 in the clockwise direction and the counterclockwise direction around the axis so that the pipette tip 10 drops from both the one side and the other side. By thus providing a gap of unequal size on both sides of the rotating roller 140 and rotationally driving the rotating roller 140 in both directions, it is possible to effectively prevent jamming of the pipette tip 10 in the vicinity of the opening 23.

In the example of FIG. 16, the rotating roller 140 also is provided so as to be bridged over both ends of the opening 23. The rotating roller 140 extends from one end of the opening 23 to the other end along the width direction of the belt 30. The outer diameter of both end portions of the rotating roller 140 is smaller than the outer diameter of the central portion.

Specifically, the outer diameter of the columnar part 142 of the rotating roller 140 is smaller at both end portions than at the center portion, and the columnar part 142 has a so-called barrel shape. Note that the protrusion amount of the protrusion 141 is substantially constant at any part. Therefore, in accordance with the change in the outer diameter of the columnar part 142, the outer diameter d3 of both end portions of the rotating roller 140 is smaller than the outer diameter d2 of the central portion as the entirety of the rotating roller 140. Hence, the gap between the rotating roller 140 and the opening edge portion 23a is small at the center portion in the axial direction of the rotating roller 140, and increases at positions near the opening edge portions 23a at both ends of the rotating roller 140. Here, at the positions near the opening edge portions 23a at both ends of the rotating roller 140, the pipette tip 10 is easily sandwiched between the rotating roller 140 and the opening edge portion 23a. By making the outer diameter of both end portions of the rotating roller 140 smaller than the central portion, the space between the end portion of the rotating roller 140 and the opening edge portion 23a can be increased, so that the pipette tip 10 can be prevented from being caught and bent.
Belt In the example of FIG. 15, the belt 30 is disposed at a position where the pipette tip 10 drops from the opening 23 of the pipette tip storage unit 20. That is, the belt 30 is provided so as to overlap vertically with the pipette tip storage unit 20, and the pipette tip 10 drops onto the belt 30 from the opening 23 of the pipette tip storage unit 20. In this way the pipette tip 10 can be supplied to the belt 30 by dropping the pipette tip 10 from the pipette tip storage unit 20. Occurrence of jamming of the pipette tip 10 between the pipette tip storage unit 20 and the belt 30 can be suppressed compared with when a chute for sliding and transporting the pipette tip 10 is provided. Since the pipette tip storage unit 20 and the belt 30 also are in a vertically aligned positional relationship, the installation area of the pipette tip supply mechanism 100 can be reduced.

At the supply position where the pipette tip 10 drops, a locking plate 150 provided for preventing the dropping of the pipette tip 10 toward the upstream side in the carrying direction. The locking plate 150 is provided at a position near the downstream side of the pulley 32 on the upstream side in the transport direction.

The belt 30 is formed in a loop shape and wound around a pair of pulleys 32. The pipette tip 10 on the surface of the belt 30 is rollably rotatable about its longitudinal axis, and the belt 30 is inclined upward in the transport direction DF so that the longitudinal axis of the pipette tip 10 rolled in conjunction with the drive in the transport direction DF faces toward the transport direction DF.

In the example of FIG. 15, the surface 31 on which the pipette tip 10 of the belt 30 is disposed is a flat surface without substantial unevenness. The surface 31 is formed as a flat surface over the entire surface.

The belt 30 is linearly inclined at a substantially constant inclination angle θ from the transport start point ST toward the transport end point ED. The inclination angle θ of the belt 30 is appropriately set according to the material of the belt 30 and the friction coefficient. The belt 30 is preferably made of a fiber material or a resin material having a relatively low elasticity and a low friction coefficient as compared with a rubber material having high elasticity and high friction coefficient.

In FIG. 15, the inclination angle θ of the belt 30 is 20 degrees or more and 35 degrees or less relative to the horizontal plane. Here, the closer the belt 30 is to horizontal, a transport force can be applied to the pipette tip 10 without slippage, and as the inclination angle approaches 90 degrees the pipette tip 10 readily slips more and the transport force acts on the pipette tip 10. As a result of examination by the inventors of the present invention, when the inclination angle of the belt 30 is less than 20 degrees, the pipette tips 10 are easily transported collectively, making it difficult to separate and release the aggregate of the pipette tips 10. When the inclination angle of the belt 30 is greater than 35 degrees, the pipette tip 10 slips excessively and the transportability of the pipette tip 10 is reduced. Therefore, in the pipette tip supply mechanism 100, which requires a function of separating an aggregate of a large number of pipette tips into separate pieces and feeding them one by one without jamming, the inclination angle θ of the belt 30 is set to 20 degrees or more and 35 degrees or less. In the example of FIG. 15, the inclination angle θ of the belt 30 is about 23 degrees.

Figure 21:
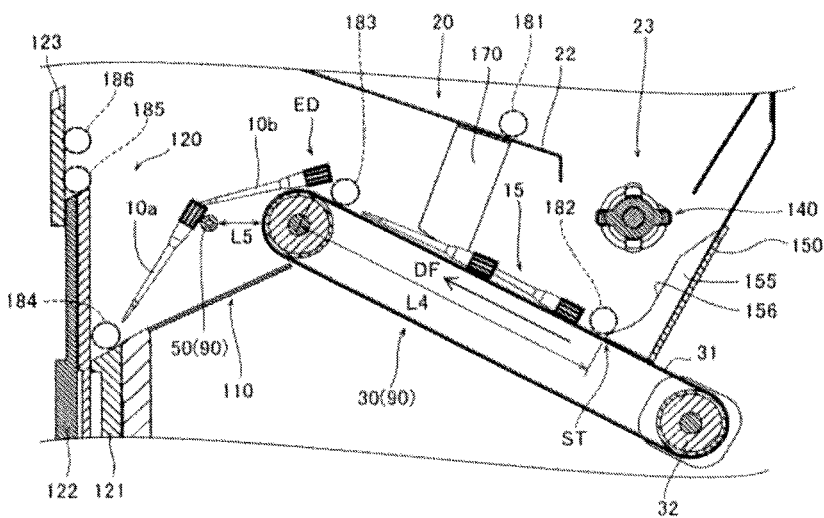
FIG. 21 is a view illustrating a position of a sensor provided in a pipette tip supply mechanism.

The transport distance from the transport start point ST of the belt 30 to the transport end point ED is L4 (see FIG. 21). The transport distance L4 is set to a distance that allows rolling and rotating of the pipette tip 10 until reaching the posture P2 along the transport direction DF by the transport end point ED even when a pipette tip cluster 15 is supplied in the posture P1 along the width direction, for example.

Figure 17:
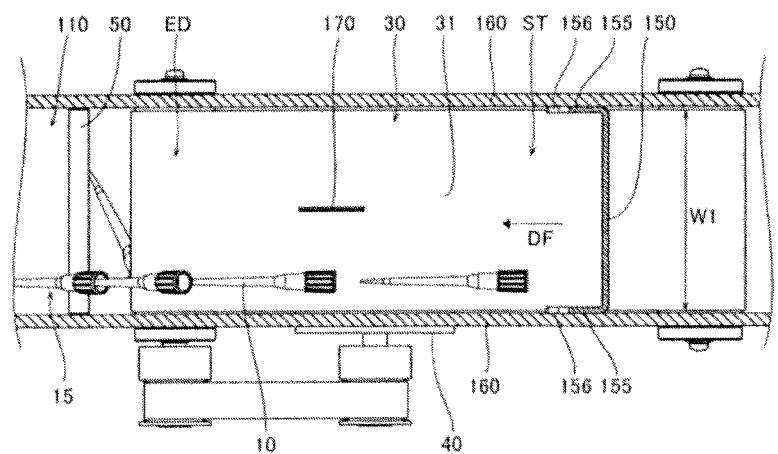
FIG. 17 is an enlarged plan view of the upper surface of the belt shown in FIG. 15.

As shown in FIG. 17, the belt 30 has a width equal to or larger than the longitudinal length of the pipette tip cluster 15 overlapped with the tip of one of the two pipette tips 10 inserted in the other. That is, the width dimension W1 of the belt 30 is greater than or equal to the first distance L1 shown in FIG. 5. In this way it is possible to ensure a space for aligning the directions by rotating the pipette tip cluster 15 even when the pipette tip clusters 15 is supplied from the pipette tip storage unit 20 in the width direction of the belt 30. It also is possible to prevent the pipette tip cluster 15 from protruding to the outside of the belt 30 or get caught in the gap on the belt 30.

In the example of FIG. 17, the pipette tip supply mechanism 100 has side walls 160 on both sides of the belt 30 for preventing the pipette tip 10 from falling from the belt 30. The distance between the side walls 160 on both sides is substantially equal to the width dimension W1 of the belt 30.

However, in order not to obstruct the rotational drive of the belt 30, the side walls 160 on both sides are disposed with a slight gap from the belt 30. The side walls 160 on both sides are provided over the entire length in the transport direction DF of the belt 30. In this way it is possible to prevent the pipette tip 10 from dropping from the belt 30 by the side walls 160 on both sides even when the pipette tip 10 rolls on the belt 30.

Note that in the example shown in FIG. 17, the side wall 160 configures the side surfaces on both sides in the width direction not only the belt 30 but also in the receiving unit 110, the cutout part 120 and the like. The side wall 160 configures a side chassis of the pipette tip supply mechanism 100. Independent side walls also may be provided only on both sides in the width direction of the belt 30.

Figure 18A:
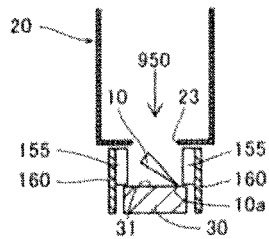
FIG. 18A is a cross-sectional view when a cover member is provided.
Figure 18B:
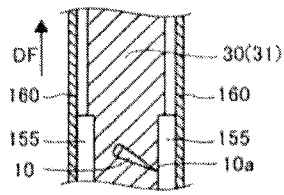
FIG. 18B is a view taken along arrow 950 of FIG. 18A.
Figure 18C:
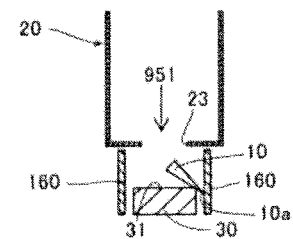
FIG. 18C is a cross-sectional view of an example not provided with a cover member.
Figure 18D:
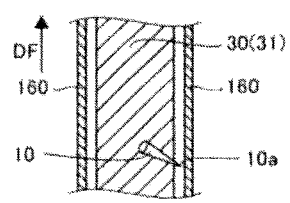
FIG. 18D is a view as seen from arrow 951 of FIG. 18C.

In the examples of FIGS. 15 and 17, the pipette tip supply mechanism 100 is provided with a cover member 155 which covers the gap between the side wall 160 and the belt 30 at the supply position where the pipette tip 10 is supplied onto the belt 30. The cover member 155 is a plate member spaced slightly upward from the upper surface of the belt 30 and provided so as to be in close contact with the side wall 160. As described above, the pipette tip 10 has a tapered shape, and the tip 11 tends to be caught in the gap. In particular, as shown in FIGS. 18C and 18D, it is difficult to control the orientation of the dropping pipette tip 10 at the supply position from the pipette tip storage unit 20 onto the belt 30, and the tip 11 of the pipette tip 10 faces the side wall 160 and the belt 30. Therefore, as shown in FIGS. 18A and 18B, it is possible to more reliably suppress the pipette tip 10 from being caught in the gap between the side wall 160 and the belt 30 by providing the cover member 155.

In the example of FIG. 15, the cover member 155 extends in a direction approaching the opening 23 side along the side wall 160. The cover member 155 is inclined so that the end surface 156 (see FIG. 21) on the downstream side in the transport direction is inclined so as to protrudes to the downstream side in the transport direction as it approaches the belt 30 side from the opening 23 side. Therefore, when the leading end 11 of the pipette tip 10 dropping from the opening 23 comes into contact with the cover member 155, it is directed to the downstream side in the transport direction along the end face 156. Hence, even if the leading end 11 of the pipette tip 10 tends to get caught in the gap between the belt 30 and the side wall 160 at a position downstream of the cover member 155, the pipette tip 10 is easily removed from the gap by the rotational drive of the belt 30 since the pipette tip 10 is sandwiched in an orientation that is sufficiently inclined along the belt 30.

In the example of FIG. 17, the cover member 155 is provided integrally with the locking plate 150. That is, the cover member 155 is formed so as to protrude in the transport direction DF from both ends in the width direction of the locking plate 150. The cover member 155 also may be provided separately from the locking plate 150.

In the examples of FIGS. 15 and 17, the pipette tip supply mechanism 100 is provided with a regulating member 170 arranged to come into contact with the pipette tip 10 on the belt 30. The regulating member 170 is arranged above the belt 30 in a state of non-contact with the belt 30 between the transport start point ST and the transport end point ED. In FIG. 15, the upper end of the regulating member 170 is fixed to the bottom surface 22 of the pipette tip storage unit 20, and the lower end of the regulating member 170 is disposed in a position near the upper surface of the belt 30. The regulating member 170 comes in contact with the pipette tip 10 to eliminate the overlapping state, for example, when the pipette tip 10 is transported on the belt 30 in a state in which they are stacked one above the other in an overlapping manner. In the example of FIG. 15, the regulating member 170 is a plate-like member extending along the transport direction DF. Therefore, it is expected that the regulating member 170 can guide the pipette tip 10 that is not aligned in the transport direction DF on the belt 30 along the transport direction DF.

In the example of FIG. 15, the belt drive unit 40 is configured by an electric motor. The belt drive unit 40 is connected to the pulley 32 on the downstream side. The belt 30 is driven in the transport direction DF by rotationally driving the pulley 32.

Pipette Tip Contact Unit

The pipette tip contact unit 50 is provided at a position away from the belt 30 on the downstream side of the belt 30 in the transport direction DF. The pipette tip contact unit 50 is a columnar member having a circular cross unit and extending linearly along the width direction of the belt 30. The pipette tip contact unit 50 is supported at both ends by side walls 160 on both sides.

As shown in FIG. 6 to FIG. 10, the pipette tip contact unit 50 is disposed at a position which is closer to the first distance L1 than the second distance L2 from the transport end point ED of the belt 30. The pipette tip contact unit 50 is disposed at a position closer to the third distance L3 from the transport end point ED of the belt 30. The distance L5 (see FIG. 21) from the transport end point ED of the pipette tip contact unit 50 is less than the first distance L1 and the third distance L3, and greater than the second distance L2. The pipette tip contact unit 50 is disposed at a position lower than the belt upper surface at the transport end point ED of the belt 30. Specifically, the pipette tip contact unit 50 is provided at a height position that is substantially horizontally aligned with the central axis of the pulley 32 on the downstream side in the transport direction. The pipette tip contact unit 50 is disposed at a position where it comes into contact with the pipette tip 10 which is delivered from the belt 30 and dropped at the transport end point ED.

Housing Unit

The receiving unit 110 receives the pipette tip 10 dropped from the transport end point ED of the belt 30. The receiving unit 110 is disposed at a position lower than the surface of the belt 30 at the transport ending point ED. In FIG. 15, the receiving unit 110 is provided at a position right under the pulley 32 on the downstream side in the transport direction DF, and is provided so as to extend to the cutout part 120. The receiving unit 110 also is provided below the pipette tip contact unit 50. By providing the receiving unit 110, after contacting with the pipette tip contact unit 50 to eliminate the overlap of the pipette tip cluster 15, it is possible to reliably receive the respective pipette tips by the receiving unit 110.

The receiving unit 110 can accommodate a plurality of pipette tips 10. In the receiving unit 110, the belt 30 is driven so that, for example, about 1 to 5 pipette tips 10 are accommodated. The bottom surface of the receiving unit 110 is an inclined surface that is inclined downward from the belt 30 toward the cutout part 1200. The receiving unit 110 is configured to feed the pipette tip 10 received from the belt 30 to the cutout 120 by inclination.

Cutout

The cutout part 120 is configured to individually deliver the pipette tip 10 transported by the belt 30. By providing the cutout part 120, it is possible to feed out the loosely separated individual pipette tips 10 by the cutout part 120 one by one.

The cutout 120 includes a first lifting member 121 and a second lifting member 122, a discharge member 123, a cutout drive unit 124 for moving the first lifting member 121 up and down, a cutout drive unit 125 for moving the second lifting member.

The first lifting member 121, the second lifting member 122, and the discharge member 123 are arranged adjacent to each other in the delivery direction (the left direction in FIG. 15) in this order. The first lifting member 121, the second lifting member 122, and the discharge member 123 are arranged at different height positions so as to be staged up in this order. Each of the first lifting member 121, the second lifting member 122, and the discharge member 123 has an upper surface portion that is inclined downward in the feeding direction.

The pipette tip 10 rolls and is arranged on the upper surface portion 121a at the first lifting member 121. The pipette tip 10 on the upper surface portion 121a of the first lifting member 121 is supported by the side surface of the second lifting member 122 so as not to roll thereafter. The first lifting member 121 is lifted by the cutout drive unit 124 until the upper surface portion 121a reaches the same position as the upper surface portion 122a of the second lifting member 122 and lifts the pipette tip 10. At the raised position, the pipette tip 10 on the upper surface portion 121a of the first lifting member 121 rolls and moves to the upper surface portion 122a of the second lifting member 122.

The pipette tip 10 on the upper surface portion 122a of the second lifting member 122 is supported by the side surface of the discharge member 123 so as not to roll thereafter. The second lifting member 122 is raised by the cutout drive unit 125 until the upper surface portion 121a reaches the same position as the upper surface portion of the discharge member 123. The pipette tip 10 is lifted. In the raised position, the pipette tip 10 on the upper surface portion 122a of the second lifting member 122 rolls and moves to the upper surface portion of the discharge member 123. The discharge member 123 is adjacent to the delivery mechanism 130. In this way the pipette tip 10 transported to the upper surface portion of the discharge member 123 passes over the discharge member 123 and rolls and moves to the delivery mechanism 130.

After the first lifting member 121 and the second lifting member 122 reach their respective raised positions, they are lowered and returned to the lowered position shown in FIG. 15. The first lifting member 121 and the second lifting member 122 are repeatedly moved up and down between the ascending position and the descending position.

The upper surface portion 121a of the first lifting member 121 and the upper surface portion 122a of the second lifting member 122 are formed so as to be able to lift the pipette tip 10 and transfer it to the next member in a state in which only one pipette tip 10 is oriented along the width direction. When the orientation is inappropriate or a plurality of pipette tips 10 overlap, they are sifted in the process of ascent of the first lifting member 121 or the second lifting member 122. As a result, the cutout part 120 supplies the pipette tips 10 one by one to the delivery mechanism 130.

Delivery Mechanism

Figure 19:
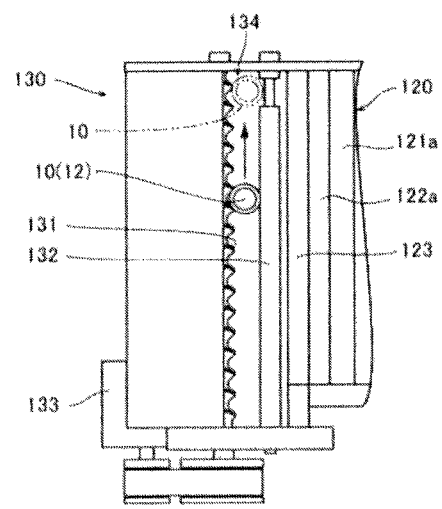
FIG. 19 is a plan view illustrating the feeding mechanism of FIG. 15.

The delivery mechanism 130 transports the pipette tip 10 supplied one by one from the cutout part 120 to the mounting position with the orientation aligned so that the sample dispensing unit 520 can perform the mounting operation. As shown in FIG. 19, the delivery mechanism 130 includes a rotary shaft 131 having a helical groove formed therein, a guide shaft 132 arranged in parallel with a predetermined gap between the rotary shaft 131 and the guide shaft 132, and a delivery drive unit 133 for rotationally driving the rotating shaft 131.

The supplied pipette tip 10 is fitted into the gap between the rotating shaft 131 and the guide shaft 132 so that the tip end 11 thereof sticks into the gap between the spiral groove of the rotating shaft 131 and the guide shaft 132. In this way the pipette tip 10 is held in an orientation in which the front end 11 faces downward and the rear end 12 faces upward.

When the rotating shaft 131 is rotationally driven by the delivery drive unit 133, the pipette tip 10 moves toward the drop port 134 by the spiral groove. The pipette tip 10 that has reached the drop port 134 drops and is set in a holder 135 (see FIG. 14) provided at a mounting position just below the drop port 134. In this way the pipette tip 10 of the sample dispensing unit 520 is mounted by engaging to the rear end 12 with the rear end 12 at mount the pipette tip 10.

Figure 20:
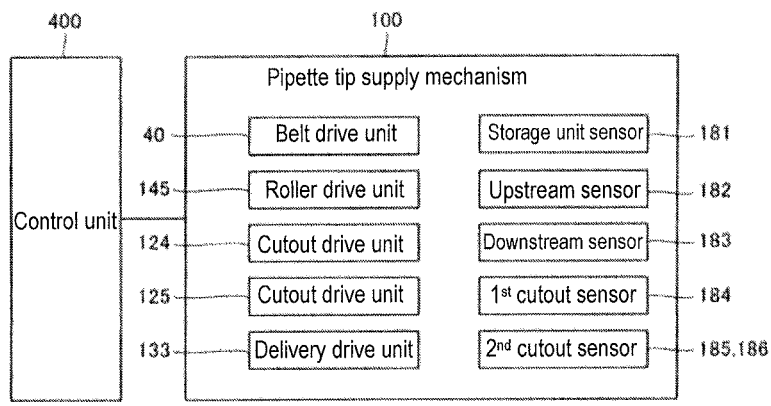
FIG. 20 is a block diagram showing a control configuration of a pipette tip supply mechanism.

As shown in FIG. 20, each drive unit of the pipette tip supply mechanism 100 is controlled by the control unit 400.

The pipette tip supply mechanism 100 includes a sensor for controlling the supply operation of the pipette tip 10. More specifically, the pipette tip supply mechanism 100 mainly includes a storage unit sensor 181, an upstream sensor 182, a downstream sensor 183, a first cutout sensor 184, and second cutout sensors 185 and 186. Although these sensors are not particularly limited, they are optical sensors, for example, photo interrupters for detecting the presence or absence of the pipette tip 10 between the light emitting portion and the light receiving portion. These sensors are configured to output a detection signal to the control unit 400.

In FIG. 21, detection positions of the respective sensors are indicated by circular broken lines. The storage unit 181 is provided in the pipette tip storage unit 20 and detects the pipette tips 10 in the pipette tip storage unit 20. The storage unit sensor 181 can detect the remaining amount in the pipette tip storage unit 20. When the remaining amount in the pipette tip storage unit 20 is small, the control unit 400 notifies the user to prompt the user to insert new pipette tips 10 by a notifying unit such as a monitor or a speaker (not shown).

The upstream sensor 182 and the downstream sensor 183 respectively detect the pipette tip 10 on the belt 30. The upstream sensor 182 is provided in the vicinity of the transport starting point ST. The upstream sensor 182 can detect whether the pipette tip 10 is supplied to the supply position of the belt 30. The downstream sensor 183 is provided in the vicinity of the transport end point ED. The downstream sensor 183 can detect whether the pipette tip 10 reaches the transport end point ED of the belt 30.

The first cutout sensor 184 detects the presence or absence of the pipette tip 10 on the upper surface portion 121*a* of the first lifting member 121. The second cutout sensors 185 and 186 detect the presence or absence of the pipette tip 10 on the upper surface portion 122*a* of the second lifting member 122. The second cutout sensors 185 and 186 are arranged side by side in the vertical direction and are provided to confirm that the two pipette tips 10 do not overlap on the upper surface portion 122*a* of the second lifting member 122.

The control unit 400 controls driving of the belt 30 based on detection signals of the upstream sensor 182 and the downstream sensor 183. Hereinafter, for the sake of convenience, a state in which the pipette tip 10 is detected is referred to as "on" and a state in which it is not detected is referred to as "off".

The control unit 400 drives the roller drive unit 145 with both the upstream sensor 182 and the downstream sensor 183 turned off and causes the pipette tip storage unit 20 to supply the pipette tip 10 onto the belt 30 by the rotation of the rotating roller 140.

In a state in which the upstream sensor 182 is on and the downstream sensor 183 is off, the control unit 400 drives the belt drive unit 40 to drive the belt 30 in the transport direction DF. In this way the pipette tip 10 dropped onto the supply position on the belt 30 is transported in the transport direction DF.

The control unit 400 stops driving of the belt drive unit 40 while the downstream sensor 183 is on. Therefore, the pipette tip 10 sent to the transport end point ED is temporarily stopped when reaching the transport end point ED.

After the downstream sensor 183 is turned on, the control unit 400 resumes driving of the belt drive unit 40 according to the states of the first cutout sensor 184 and the second cutout sensors 185 and 186. Typically, after the downstream sensor 183 is turned on, the control unit 400 restarts driving of the belt drive unit 40 in a state in which the first cutout sensor 184 is off. In this way the pipette tip 10 at the transport end point ED drops into the receiving unit 110 and is supplied onto the upper surface portion 121*a* of the first lifting member 121. The control unit 400 controls the operation of the roller drive unit 145 and the belt drive unit 40 so that one or more pipette tips 10 are always present on the receiving unit 110 and the upper surface portion 121*a* of the first lifting member 121.

Note that a sensor (not shown) is also provided in the delivery mechanism 130. The control unit 400 controls the pipette tip supply mechanism 100 so that the pipette tip 10 is timely sent out to the mounting position in accordance with the operation of the sample analyzer 500. Accordingly, the delivery mechanism 130 and the cutout unit 120 are mainly controlled in accordance with the operation of the sample analyzer 500. The rotating roller 140 and the belt 30 are primarily controlled in operation according to the detection results of the respective sensors inside the pipette tip supply mechanism 100.

Outline of Immunoassay

Figure 22:
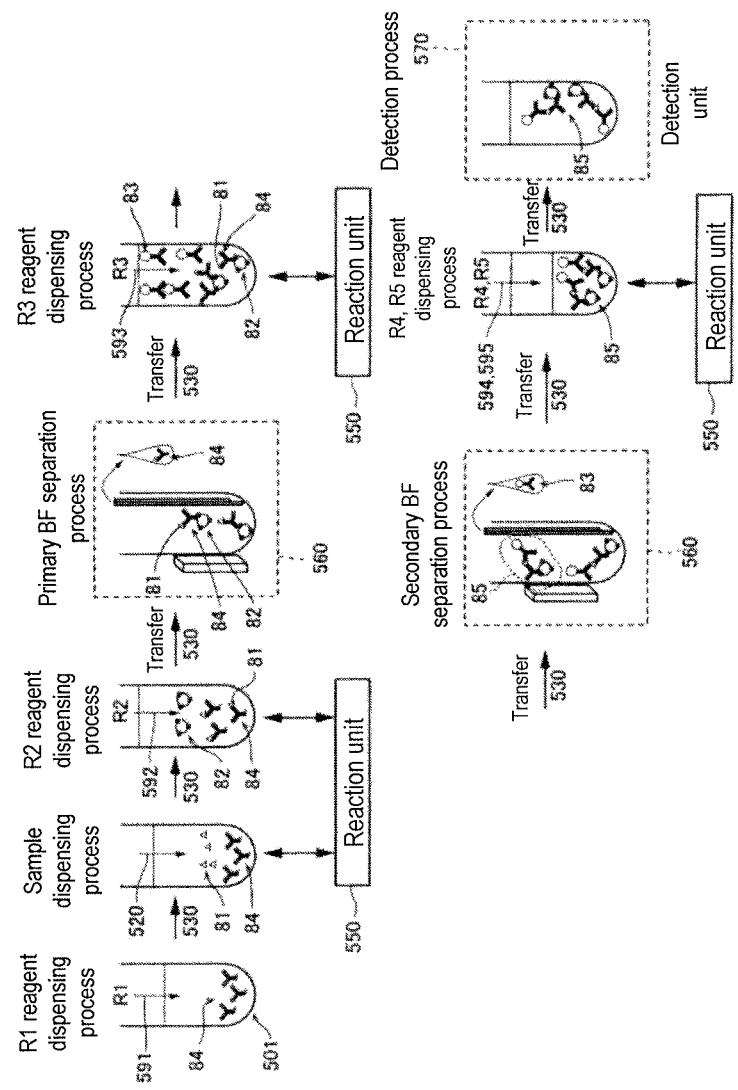
FIG. 22 is a diagram illustrating an analysis process of a sample analyzer.

Next, immunoassay by the sample analyzer 500 shown in FIG. 13 will be described. In the structural example shown in FIG. 13, immunoassay is performed using R1 reagent to R5 reagent as described above. With reference to FIG. 22, an example in which the target substance 81 is hepatitis B surface antigen (HBsAg) will be described as an example of immunoassay.

First, a sample containing the target substance 81 and R1 reagent are dispensed into the reaction container 501. The R1 reagent is dispensed into the reaction container 501 by the first reagent dispensing unit 591 and the sample is dispensed into the reaction container 501 by the sample dispensing unit 520. The R1 reagent contains the capture substance 84 and reacts with and binds to the target substance 81. The capture substance 84 contains a binding substance for the capture substance 84 to bind with the magnetic particles 82 contained in the R2 reagent.

For example, the capture substance 84 is an antibody modified with biotin (biotin antibody). That is, biotin is modified in the capture substance 84 as a binding substance. After dispensing the sample and the R1 reagent, the sample in the reaction container 501 is warmed to a predetermined temperature in the reaction unit 550, whereby the capture substance 84 and the target substance 81 are bonded.

Next, the R2 reagent is dispensed to the reaction container 501 by the second reagent dispensing unit 592. The R2 reagent contains magnetic particles 82. The magnetic particles 82 bind to the binding substance of the capture substance 84. The magnetic particles 82 are, for example, magnetic particles (StAvi-binding magnetic particles) to which streptavidin binding to biotin is immobilized. Streptavidin of StAvi-binding magnetic particles reacts with biotin as a binding substance and bonds. After dispensing the R2 reagent, the sample in the reaction container 501 is heated to a predetermined temperature in the reaction unit 550. As a result, the target substance 81 and the capture substance 84 are combined with the magnetic particles 82.

The target substance 81 and the capture substance 84 formed on the magnetic particle 82 and the unreacted capture substance 84 are separated by a primary BF separation process by the BF separation unit 560. Unreacted components such as unreacted capture substance 84 are removed from the reaction container 501 by the primary BF separation treatment.

Next, R3 reagent is dispensed into the reaction container 501 by the third reagent dispensing unit 593. The R3 reagent contains the labeling substance 83 and reacts with and binds to the target substance 81. After dispensing the R3 reagent, the sample in the reaction container 501 is heated to a predetermined temperature in the reaction unit 550. As a result, an immune complex 85 including the target substance 81, the labeling substance 83, and the capture substance 84 is formed on the magnetic particles 82. In the example of FIG. 22, the labeling substance 83 is an ALP (alkaline phosphatase)-labeled antibody.

The immunocomplex 85 formed on the magnetic particle 82 and the unreacted labeling substance 83 are separated in a secondary BF separation process by the BF separation unit 560. Unreacted components such as unreacted labeling substance 83 are removed from the reaction container 501 by the secondary BF separation treatment.

Thereafter, the R4 reagent and the R5 reagent are dispensed to the reaction container 501 by each of the fourth reagent dispensing unit 594 and the fifth reagent dispensing unit 595. The R4 reagent contains a buffer solution. The immunocomplex 85 bound to the magnetic particles 82 is dispersed in the buffer solution. The R5 reagent contains a chemiluminescent substrate. The buffer contained in the R4 reagent has a composition that promotes the reaction between the label (enzyme) of the labeling substance 83 contained in the immunocomplex 85 and the substrate. After dispensing the R4 and R5 reagents, the sample in the reaction container 501 is heated to a predetermined temperature in the reaction unit 550. Light is generated by causing the substrate to react with the label, and the intensity of the generated light is measured by the photodetector of the detection unit 570. Based on the detection signal of the detection unit 570, the control unit 400 analyzes the content or the like of the target substance 81 in the sample.

Description of Analysis Process Operation

Figure 23:
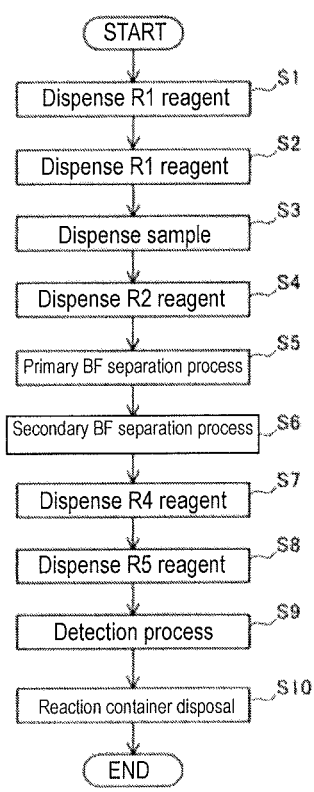
FIG. 23 is a flowchart illustrating the analysis process shown in FIG. 22.
Figure 24:
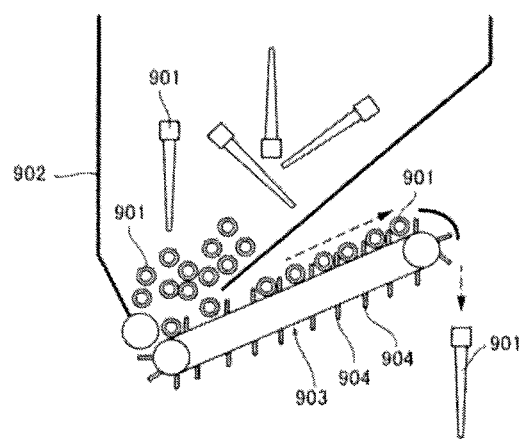
FIG. 24 is a diagram illustrating a conventional technique.

Next, the analysis process operation of the sample analyzer 500 shown in FIG. 22 will be described with reference to FIG. 23. The process of each step shown in FIG. 23 is controlled by the control unit 400.

In step S1, the control unit 400 causes the container transfer unit 530 to transfer the reaction container 501 to the R1 reagent dispensing position. The control unit 400 causes the first reagent dispensing unit 591 to dispose the R1 reagent into the reaction container 501.

In step S2, the sample is dispensed into the reaction container 501. The control unit 400 attaches the pipette tip 10 supplied from the pipette tip supply mechanism 100 to the dispensing nozzle 521 (see FIG. 14) of the sample dispensing unit 520. The control unit 400 causes the sample dispensing unit 520 to suction the sample from the sample container 511 on the sample transport unit 510. The control unit 400 dispenses the sample suctioned into the pipette tip 10 into the reaction container 501 by the sample dispensing unit 520, and then discards the attached pipette tip 10. The sample dispensing unit 520 replaces the pipette tip 10 with an unused pipette tip 10 every time a dispensing operation is performed via the pipette tip 10.

In step S3, the control unit 400 causes the container transfer unit 530 to transfer the reaction container 501 to the R2 reagent dispensing position, and causes the second reagent dispensing unit 592 to dispose the R2 reagent into the reaction container 501. After dispensing the R2 reagent, the control unit 400 causes the container transfer unit 530 to transfer the reaction container 501 to the reaction unit 550. The reaction container 501 is heated in the reaction unit 550 for a predetermined time.

In step S4, the control unit 400 causes the BF separation unit 560 to execute the primary BF separation process. First, the control unit 400 causes the container transfer unit 530 to transfer the reaction container 501 to the BF separation unit 560. The BF separation unit 560 is controlled to perform a primary BF separation process on the sample in the reaction container 501.

In step S5, the control unit 400 transfers the reaction container 501 to the R3 reagent dispensing position by the container transfer unit 530, and dispenses the R3 reagent into the reaction container 501 by the third reagent dispensing unit 593. After dispensing the R3 reagent, the control unit 400 causes the container transfer unit 530 to transfer the reaction container 501 to the reaction unit 550. The reaction container 501 is heated in the reaction unit 550 for a predetermined time.

In step S6, the control unit 400 causes the BF separation unit 560 to execute the secondary BF separation process. First, the control unit 400 causes the container transfer unit 530 to transfer the reaction container 501 to the BF separation unit 560. The BF separation unit 560 is controlled to perform secondary BF separation process on the sample in the reaction container 501.

In step S7, the R4 reagent is dispensed into the reaction container 501. The control unit 400 causes the container transfer unit 530 to transfer the reaction container 501 to the R4 reagent dispensing position, and dispenses the R4 reagent into the reaction container 501 by the fourth reagent dispensing unit 594.

In step S8, the R5 reagent is dispensed into the reaction container 501. The control unit 400 causes the container transfer unit 530 to transfer the reaction container 501 to the R5 reagent dispensing position, and dispenses the R5 reagent into the reaction container 501 by the fifth reagent dispensing unit 595. After dispensing the R5 reagent, the control unit 400 causes the container transfer unit 530 to transfer the reaction container 501 to the reaction unit 550. The reaction container 501 is heated in the reaction unit 550 for a predetermined time.

In step S9, a detection process of the immune complex 85 is performed. The control unit 400 causes the container transfer unit 530 to transfer the reaction container 501 to the detection unit 570. The detection unit 570 measures the intensity of light generated by causing the substrate to react with the label. The detection result of the detection unit 570 is output to the control unit 400.

After completion of detection, in step S10, the container transfer unit 530 is controlled so that the analyzed and processed reaction container 501 is taken out from the detection unit 570 and discarded to a disposal port (not shown).

As described above, the analysis process operation is performed by the sample analyzer 500.

Note that the embodiments disclosed herein are examples in all respects and are not restrictive. The scope of the present invention is indicated not by the description of the above embodiments but by the scope of the claims, and includes meanings equivalent to the claims and all modification within the scope thereof.

What is claimed is:

1. A pipette tip supply mechanism comprising:
    a pipette tip storage unit for storing a plurality of tapered shaped pipette tips;
    a belt for transporting a pipette tip supplied from an opening of the pipette tip storage unit; and
    a belt drive unit that drives the belt in a transport direction;
    wherein the belt is inclined upwards toward the transport direction so that the pipette tip is rotatable around a longitudinal axis of the pipette tip on a surface of the belt and the pipette tip is rolled to orient the longitudinal axis of the pipette tip along the transport direction in conjunction with the drive of the belt in the transport direction; and
    wherein the surface of the belt on which the pipette tip is disposed is a flat surface having no substantial unevenness.

2. The pipette tip supply mechanism according to claim 1, further comprising:
    a pipette tip contact unit for contacting an overlapped pipette tip cluster in which an end of one of two pipette tips is inserted inside another pipette tip and eliminating the overlap of the pipette tip cluster at a transport end point of the belt.

3. The pipette tip supply mechanism according to claim 2, wherein,
    when a length in a longitudinal direction of the pipette tip cluster is set as a first distance and a length from a rear end opposite to a tip of one pipette tip to a center of gravity is set as a second distance,
    the pipette tip contact unit is disposed at a position separated from the transport end point of the belt by a distance that is less than the first distance and greater than the second distance.

4. The pipette tip supply mechanism according to claim 3, wherein,
    when a length in a longitudinal direction of one pipette tip is set as a third distance,
    the pipette tip contact unit is disposed at a position separated from the transport end point of the belt by a distance that is less than the third distance.

5. The pipette tip supply mechanism according to claim 2, wherein
    the pipette tip contact unit is disposed at a position lower than an upper surface of the belt at the transport end point of the belt.

6. The pipette tip supply mechanism according to claim 1, wherein
    the belt is inclined so that a transport start point of the belt, at which the pipette tip is received from the opening of the pipette tip storage unit, is lower than a transport end point of the belt.

7. The pipette tip supply mechanism according to claim 1, wherein
    an inclination angle of the belt is 20 degrees or more and 35 degrees or less relative to a horizontal plane.

8. The pipette tip supply mechanism according to claim 1, wherein
    the belt has a width equal to or greater than a longitudinal length of an overlapped pipette tip cluster in a state in which the tip of one of two pipette tips is inserted inside another pipette tip.

9. The pipette tip supply mechanism according to claim 1, wherein
    the pipette tip storage unit has an opening on a bottom surface disposed above the belt; and
    the belt is disposed at a position where the pipette tip drops from the opening of the pipette tip storage unit.

10. The pipette tip supply mechanism according to claim 1, further comprising:
    side walls for preventing the pipette tip from falling off the belt on bilateral sides of the belt.

11. The pipette tip supply mechanism according to claim 10, further comprising:
    a cover member that covers a gap between the side walls and the belt at a supply position where the pipette tip is supplied onto the belt.

12. The pipette tip supply mechanism according to claim 1, further comprising:
    a rotating roller provided in the opening of the pipette tip storage unit; and
    a roller drive unit for driving the rotating roller.

13. The pipette tip supply mechanism according to claim 12, wherein
    the rotating roller has projections on its surface.

14. The pipette tip supply mechanism according to claim 12, wherein
    the rotating roller is provided so as to extend toward both ends of the opening, and an outer diameter of both end parts of the rotating roller is smaller than an outer diameter of a central part of the rotating roller.

15. The pipette tip supply mechanism according to claim 2, further comprising:
    a receiving unit provided below the pipette tip contact unit for receiving a pipette tip dropped from the transport end point of the belt.

16. The pipette tip supply mechanism according to claim 1, further comprising:
    a cutout part for separately feeding the pipette tip transported by the belt.

17. A pipette tip supply method comprising steps of:
    providing a mechanism comprising:
    a pipette tip storage unit storing a plurality of tapered shaped pipette tips,
    an inclined belt for transporting a pipette tip supplied from an opening of the pipette tip storage unit, and
    a belt drive unit that drives the belt in a transport direction;
    supplying a pipette tip to the inclined belt, and
    transporting the pipette tip on the belt so that the pipette tip rotates around a longitudinal axis of the pipette tip on a surface of the belt and the pipette tip is rolled to orient the longitudinal axis of the pipette tip along the transport direction in conjunction with the drive of the belt in the transport direction;
    wherein the surface of the belt on which the pipette tip is disposed is a flat surface having no substantial unevenness.

18. The pipette tip supply method according to claim 17, further comprising
eliminating a overlap of a pipette tip cluster in which an end of one of two pipette tips is inserted inside another pipette tip by contacting the overlapped pipette tip cluster with a pipette tip contact unit at a transport end point of the belt.

* * * * *